United States Patent
Xie et al.

(10) Patent No.: US 12,448,315 B2
(45) Date of Patent: Oct. 21, 2025

(54) GLASS TEMPERING FURNACE AND GLASS TEMPERING METHOD

(71) Applicants: SONGSHAN LAKE MATERIALS LABORATORY, Guangdong (CN); ZHONGKE ZHUOYI GREENE TECH (DONGGUAN) CO., LTD., Guangdong (CN)

(72) Inventors: Binghan Xie, Guangdong (CN); Chao Fu, Guangdong (CN); Zhiheng Ren, Guangdong (CN)

(73) Assignees: Songshan Lake Materials Laboratory (CN); Zhongke Zhuoyi Greene Tech (Dongguan) Co., Ltd. (CN)

( * ) Notice: Subject to any disclaimer, the term of this patent is extended or adjusted under 35 U.S.C. 154(b) by 0 days.

(21) Appl. No.: 18/844,305

(22) PCT Filed: Oct. 26, 2023

(86) PCT No.: PCT/CN2023/126858
§ 371 (c)(1),
(2) Date: Sep. 5, 2024

(87) PCT Pub. No.: WO2024/093794
PCT Pub. Date: May 10, 2024

(65) Prior Publication Data
US 2025/0109055 A1 Apr. 3, 2025

(30) Foreign Application Priority Data

| Nov. 1, 2022 | (CN) | 202211358216.6 |
| Nov. 1, 2022 | (CN) | 202222929439.5 |
| Sep. 4, 2023 | (CN) | 202322399577.1 |

(51) Int. Cl.
*C03B 27/04* (2006.01)
*C03B 35/16* (2006.01)
(Continued)

(52) U.S. Cl.
CPC .......... *C03B 27/0404* (2013.01); *C03B 35/16* (2013.01); *F27B 9/12* (2013.01); *F27B 9/24* (2013.01)

(58) Field of Classification Search
CPC ....... C03B 25/04–12; C03B 27/04–067; F27B 2009/122; F23C 99/006; F23D 14/16
See application file for complete search history.

(56) References Cited

U.S. PATENT DOCUMENTS 4,300,937 A * 11/1981 Rhonehouse ......... C03B 35/189
65/351
4,481,025 A * 11/1984 Rodriguez .............. C03B 25/06
65/348
(Continued)

FOREIGN PATENT DOCUMENTS

| CN | 201058845 Y | 5/2008 |
| CN | 202022846 U | 11/2011 |

(Continued)

OTHER PUBLICATIONS

Office Action for corresponding JP Appl. No. 2024-550317.
(Continued)

*Primary Examiner* — Erin Snelting
(74) *Attorney, Agent, or Firm* — Lisa E. Geary; Eckert Seamans Cherin & Mellott LLC

(57) ABSTRACT

Provided are a glass tempering furnace and method. The glass tempering furnace includes a preheating furnace section, a heating furnace section, and a soaking furnace section. The preheating furnace section is divided into multiple sections along the glass traveling direction. Each section has a smoke suction port and a smoke ejection port. The preheating furnace section is configured to suck smoke from the heating furnace section through the smoke suction port. The smoke ejection port is configured to deliver the sucked smoke to the preheating furnace section. The heating (Continued)

furnace section has multiple infrared burners. Each infrared burner is a porous medium burner. Multiple air ducts are disposed in the soaking furnace section and configured to generate horizontally parallel airflow on the upper and lower surfaces of glass.

21 Claims, 11 Drawing Sheets

(51) Int. Cl.
*F27B 9/12* (2006.01)
*F27B 9/24* (2006.01)

(56) References Cited

U.S. PATENT DOCUMENTS

| | | | |
|---|---|---|---|
| 6,427,488 | B1 | 8/2002 | Vitkala et al. |
| 7,666,367 | B1 * | 2/2010 | Durst .................. B01J 8/0426 422/240 |
| 2004/0093904 | A1 | 5/2004 | Haws et al. |
| 2016/0031739 | A1 | 2/2016 | Lezzi et al. |
| 2017/0334760 | A1 | 11/2017 | Kylväjä |

FOREIGN PATENT DOCUMENTS

| | | |
|---|---|---|
| CN | 204224446 U | 3/2015 |
| CN | 106865964 A | 6/2017 |
| CN | 208857146 U | 5/2019 |
| CN | 110526561 A | 12/2019 |
| CN | 110981174 A | 4/2020 |
| CN | 112179138 A | 1/2021 |
| CN | 112665376 A | 4/2021 |
| CN | 215403833 U | 1/2022 |
| CN | 216377924 U | 4/2022 |
| CN | 114605060 A | 6/2022 |
| CN | 115650567 A | 1/2023 |
| JP | 2016536255 A | 11/2016 |
| KR | 101626282 B1 | 6/2016 |

OTHER PUBLICATIONS

International Search Report mailed Jul. 18, 2023 for corresponding Int'l Appln. No. PCT/CN2022/136702.
Office Action for corresponding CN Appl. No. 2022113582166.
Supplemental Office Action for corresponding CN Appl. No. 2022113582166.
Supplementary European Search Report dated Apr. 29, 2025 for corresponding European Application No. 23884726.

* cited by examiner

GLASS TEMPERING FURNACE AND GLASS TEMPERING METHOD

CROSS-REFERENCE TO RELATED APPLICATIONS

This application is a national stage application filed under 35 U.S.C. 371 based on International Patent Application No. PCT/CN2023/126858, filed on Oct. 26, 2023, which claims priority to Chinese Patent Application No. 202211358216.6 filed Nov. 1, 2022, Chinese Patent Application No. 202222929439.5 filed Nov. 1, 2022, and Chinese Patent Application No. 202322399577.1 filed Sep. 4, 2023, the disclosures of which are incorporated herein by reference in their entireties.

TECHNICAL FIELD

The present application relates to the field of glass tempering, for example, a glass tempering furnace and method.

BACKGROUND

Glass, as a transparent or translucent amorphous material, exhibits unique properties during heat transfer. Glass is a structure with short-range order and long-range disorder. Glass is transparent or translucent to visible light and infrared light. When receiving external heat, the internal of the glass generates high-frequency electromagnetic radiation. This heat transfer process is called photon conduction. At room temperature, photon conduction in transparent glass accounts for approximately 10% of the total heat transfer. As the temperature increases, the effect of photon conduction increases, and the volumetric radiation occurs inside the glass.

Ordinary transparent glass has a high emissivity and can absorb thermal radiation well. Applying a thin film having low emissivity property onto the surface of ordinary glass creates Low-E glass. The most significant feature of Low-E glass is high reflectance for far-infrared radiation, low emissivity for near-infrared radiation, and high transmittance for visible light. This means that after using Low-E glass in buildings, the visible light portion of sunlight can penetrate, providing daylighting, while most of the infrared radiation that can generate heat is blocked outside the window. Due to surface modification of Low-E glass, many problems arise during a tempering and heating process.

Compared with ordinary glass, tempered glass is considered as safety glass. Tempered glass is actually prestressed glass. To enhance the strength of glass, chemical or physical methods are typically used to create compressive stress on the surface of the glass. When subjected to an external force, the glass first offsets the surface stress, thereby increasing the load-bearing capacity and enhancing the resistance to wind pressure, temperature variations, and impact.

The tempering of glass is divided into "physical tempering" and "chemical tempering."

Physical tempering involves heating ordinary flat glass in a furnace to near its softening temperature (about 600° C.), eliminating internal stress by deformation of the glass, removing the glass from the furnace, and blowing high-pressure cold air onto both sides of the glass by multiple nozzles to rapidly and uniformly cool the glass to room temperature, thus producing tempered glass.

Chemical tempering, which enhances the strength of glass by altering chemical composition of the surface of the glass, is typically tempered by using an ion exchange method. The method involves immersing silicate glass containing alkali metal ions into molten lithium (Li+) salt and making Na+ or K+ ions on the surface of the glass exchange with Li+ ions to form a Li+ ion exchange layer on the surface of the glass. Since Li+ ions have a smaller expansion coefficient than Na+ or K+ ions, the outer layer contracts less while the inner layer contracts more during cooling. As a result, upon reaching room temperature, the glass is subjected to tension in the inner layer and compression in the outer layer, similar to the effect observed in physically tempered glass.

The present application discusses the device involved in physical tempering, namely a tempering furnace.

From the perspective of heat transfer, the heating process of glass in the tempering furnace involves radiation heat transfer, convective heat transfer, and thermal conduction.

Radiation heat transfer: Radiation is ubiquitous. When a piece of cold glass enters the heating furnace section of the glass tempering furnace, various heating elements, furnace wall insulation materials, and ceramic rollers emit radiant heat to heat the glass. Waves have two forms, "absorption+ penetration", for the heated object. Only when the waves are absorbed, can the object be heated. In terms of the spectrum curve of glass, due to the composition of the glass, the glass appears as "peaks and valleys" on the infrared transmission curve, rather than a straight line. Corresponding to the "valleys" is the range of wavelengths that the glass can absorb. The wavelengths that the glass can absorb are not uniform.

FIG. 12 shows an infrared transmission curve of a glass in an embodiment. Curves for different types of glass vary. This requires that during the heating process of glass in the tempering furnace, the wavelength of the radiated waves from the heat source should be a "broadband" wave, covering as much as possible the absorbed wavelengths corresponding to different types of glass. In fact, this also requires that the temperature of the heat source can be both high and relatively low (compared with a resistance wire).

Convective heat transfer: In the production process of tempered glass, several convective heat transfer modes exist.

1. Natural convection: When there is a temperature difference inside the furnace, air flows naturally. The cold glass enters the heating furnace section. The lower surface of the glass undergoes natural convection heating while the upper surface of the glass has an air barrier due to cold air. If there is no forced convection, natural convection heating has little effect. The natural convection effect is significant on the four edges of the block-shaped flat glass, generally resulting in "hot edges" of the glass, causing the temperature of the glass edges to be too high, and thereby affecting the optical imaging quality of the glass.

2. Forced convection with a thermal equilibrium tube: Typically, there is a thermal equilibrium tube near a heating element inside the heating furnace section. Compressed air inside the tube is heated, transformed into hot air, and then blown onto the upper and lower surfaces of the glass. The thermal equilibrium gas provides forced convective heat for the glass and also ensures uniform temperature inside the heating furnace section. However, when the glass is in a softened state at a high temperature, airflow having certain velocity and pressure creates "patterns" on the surface of the softened glass. This is a drawback of this forced convection method.

3. Forced convection as the primary heating method: Gas-fired heating furnace sections and gas cushion heating furnace sections both use forced convection as one of the primary heating methods. With the rapid expansion of the market application of Low-E glass that can be tempered, forced convection heating furnace sections using high-temperature fans or compressed air have also been developed. Forced convection heating can shorten the glass heating time, improve the production efficiency, make the temperature of the glass more uniform, and enhance the product quality.

Heat conduction: The upper surface of the glass does not come into contact with components in the furnace, and only the lower surface of the glass contacts ceramic rollers. The ceramic rollers are primarily made of quartz with the addition of auxiliary materials, resulting in a thermal expansion coefficient close to zero and a low thermal conductivity. The contact (theoretically linear contact) area between the ceramic rollers and the glass is small, so thermal conduction is not the primary mode of heat transfer throughout the entire heating process. Less than 10% of the heat absorbed by the glass in the heating furnace section comes from thermal conduction. However, when cold glass initially enters the furnace, contact between the lower surface of the cold glass and hot ceramic rollers causes the glass to warp and jitter. This should be noted.

In the related art, the heat source in a radiant-type tempering furnace in the industry that is heating glass comes from electric heating elements located on the top and bottom of the furnace. These electric heating elements are typically made of nickel-chromium resistance wires. Each electric heating element is either mounted in a metal tube to radiate heat in the form of a radiation tube or sheathed on a heat-resistant ceramic tube with which a resistance wire radiates heat into the furnace. The glass is usually placed flat on drive rollers made mainly of heat-resistant ceramics and is fed into the furnace by the rotation of the rollers. To temper large-sized flat glass, electric heating elements inside the furnace are generally arranged as densely as possible on the top and bottom of the furnace. When the glass is fed into the furnace at room temperature, it undergoes radiant heat transferred from the electric heating elements and heat conducted from the drive rollers in contact with the glass. Since the furnace temperature is generally around 700° C., the drive rollers have a high temperature, resulting in significant heat transfer to the glass through conduction. This causes the temperature of the lower surface of the glass to be higher than that of the upper surface of the glass, leading to non-uniform temperature distribution along the thickness direction of the glass and resulting in bending and warping of the edges of the glass. At this time, the gravity is concentrated in the middle of the glass, forming roller marks. Non-uniform heating also causes white spots to appear in the central part of the glass. This problem becomes even more serious when the substrate of laminated glass is tempered.

Low-E glass is formed from ordinary glass whose one side is coated. During tempering, to avoid damage to the coated surface by the rollers, the glass is fed into the tempering furnace, with the side with the coating facing upwards. From a heat transfer perspective, to ensure uniform heating of the glass, it is required that the rate of heat transfer from the upper surface of the glass to the interior of the glass and the rate of heat transfer from the lower surface of the glass to the interior of the glass remain consistent during heating. The electric heating elements primarily heat the Low-E glass through radiation. Infrared radiation projected onto the object creates a noticeable thermal effect and is a major component of heat rays. The emissivity of the Low-E glass is non-uniform, with the lower surface of the glass having a high emissivity of around 0.90. After a large amount of heat is absorbed, the temperature of the lower surface increases, and the effective thermal conductivity increases so that the heat is further transferred to the inside. On the coated side, the emissivity typically ranges from 0.10 to 0.23. The coating layer reflects a large amount of infrared radiation, making it difficult for thermal radiation to transfer from the coated surface to the interior of the glass.

In the related art, to uniformly heat the surface of glass, it is necessary to completely cover the surface of the glass by using heating elements. This surface heating method is characterized by applying at least 50% of the heat from the heat source to the surface or near-surface layer of the object being heated. The heating method in the related art has limitations. For example, in the case of heating using chromium-aluminum-cobalt metal resistance wires, the maximum load on the heater surface at 1000° C. can only reach 60 kW/m$^2$, whereas the radiative power density of a comprehensive black radiator at the same temperature can reach 149 kW/m$^2$. The resistance wire heating in the related art involves extremely dense heater arrangement. This arrangement shortens the service life of the heating elements.

During a glass heating process, the highest heating temperature of a nickel-chromium heating element in the related art is 1150° C. while the highest heating temperature of an iron-chromium heating element in the related art is 1400° C. In view of furnace temperature and costs, the related art mostly uses electric heaters made of a Ni—Cr alloy. Based on the correspondence between the temperature of a heat source and the wavelength of radiation, the wavelength radiated from a heater at 1150° C. is 2.04 micrometers. Considering the furnace temperature and the tempering temperature of glass, the heating temperature of a resistance wire inside an electrically heated tempering furnace is lower than 1150° C., typically between 800° C. and 900° C. The corresponding heat source radiation wavelength is between 2.47 μm and 2.7 μm. This wavelength range is relatively narrow, and not all glasses absorb radiation within the range of 2.47 μm to 2.7 μm.

The related art is gradually beginning to use an infrared radiator to uniformly heat transparent glass to increase the heating speed of the glass and shorten the heating time. However, this method has the disadvantage that it cannot ensure uniform radiation across the entire surface of a glass, resulting in a projection of the intensity distribution of the infrared radiation source formed on the surface of the glass that requires to be heated.

To address this problem, the glass industry has introduced "forced convection heat transfer technology" into tempering furnaces. Adding upper forced convection in a roller-type tempering furnace is beneficial for symmetric heating of glass. Moreover, for Low-E glass, the presence of a coating significantly increases the heating time. Increasing forced convection can shorten the heating time and reduce the furnace temperature, greatly beneficial for reducing the coating loss and improving the production efficiency. Adding forced convection to the lower part is unnecessary. In a roller-type tempering furnace, due to unavoidable heat transfer from the roller and natural convection in the lower part, the lower part is heated too quickly and the glass is upturned to form white mist in the middle part. More importantly, the middle part is heated too fast. When the center of the glass reaches the tempering temperature, the lower surface is already overheated and too soft, resulting in pits or roller track marks on the lower surface of the glass which is a headache. This contradiction will become more prominent if forced convection is added to the lower part.

However, in glass tempering in related technologies, especially in the tempering of coated glass and Low-E glass, there are still problems in the early stage of glass entering the furnace, such as the temperature of the lower surface of the glass rising too fast, the temperature of the upper surface of the glass rising too slowly to lead to upward warping and vibration of the glass, extremely dense distribution of heating elements in the electric heating tempering furnace to lead to too short life and slow heating speed, and uneven heating phenomenon and high energy consumption caused by the infrared radiation heating technology applied to the tempering furnace.

SUMMARY

The present application proposes a glass tempering furnace and a glass tempering method that can rapidly and uniformly heat glass and that are suitable for tempering of ordinary glass, particularly coated glass and Low-E glass.

The present application provides a glass tempering furnace. The glass tempering furnace includes a preheating furnace section, a heating furnace section, and a soaking furnace section. The preheating furnace section has a feed port. A general smoke vent is formed at the feed port. The preheating furnace section is divided into a plurality of sections along the glass traveling direction. Each section has a smoke suction port and a smoke ejection port. The heating furnace section has a plurality of infrared burners. Each infrared burner is a porous medium burner. The preheating furnace section is configured to suck smoke from the heating furnace section through the smoke suction port and eject the sucked smoke to the preheating furnace section through the smoke ejection port. The soaking furnace section is disposed after the heating furnace section along the glass traveling direction. A plurality of air ducts are disposed in the soaking furnace section and configured to generate horizontally parallel airflow on the upper and lower surfaces of glass.

The present application also provides a glass tempering method. The method is applied by the glass tempering furnace. The method includes manually (or automatically) laying and placing the glass on a side cloth table; carrying the glass on a plurality of drive rollers to the preheating furnace section and preheating the glass in the preheating furnace section; carrying the glass to the heating furnace section and heating the glass in the heating furnace section to a set temperature of 600° C. to 640° C.; and carrying the glass from the heating furnace section to the soaking furnace section and heating the glass and homogenizing the temperature of the glass by circulating gas passing the upper and lower surfaces of the glass.

Figure 1:
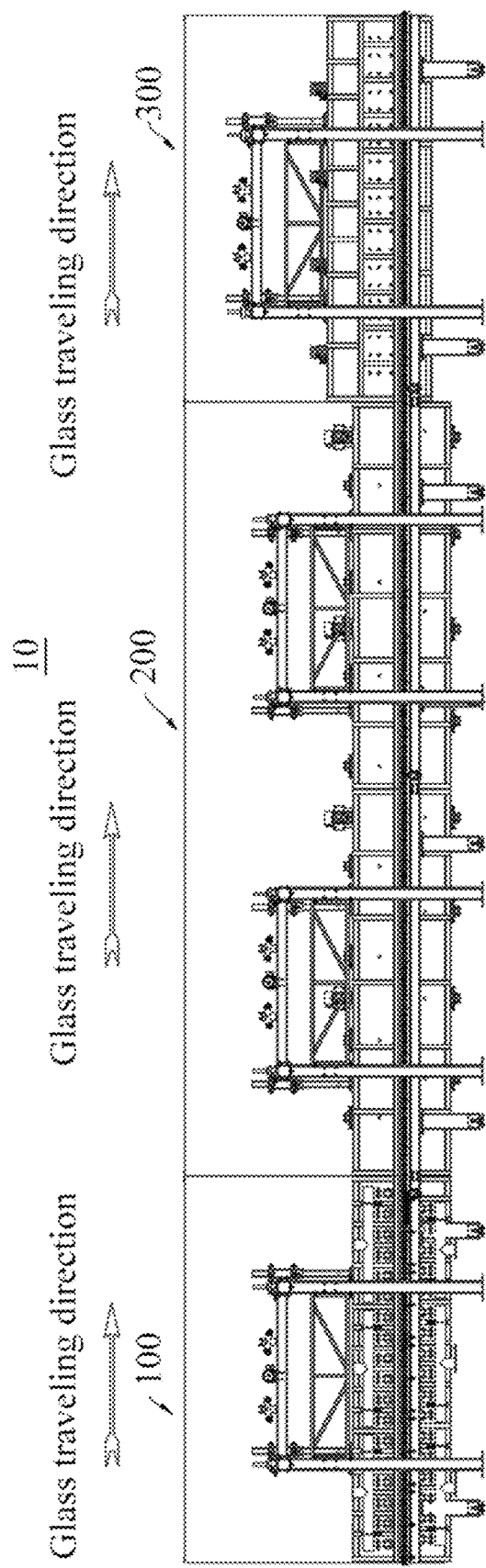
FIG. 1 illustrates a glass tempering furnace according to an embodiment of the present application.

REFERENCE LIST 10. glass tempering furnace; 20. glass;
100. preheating furnace section; 101. drive roller; 1011. first end; 1012. second end; 102. preheating-section upper furnace portion; 103. preheating-section lower furnace portion; 120. general smoke vent; 130. smoke suction port; 131. first smoke suction port; 132. second smoke suction port; 133. third smoke suction port; 134. fourth smoke suction port; 135. fifth smoke suction port; 136. sixth smoke suction port; 140. smoke ejection port; 141. first smoke ejection port; 142. second smoke ejection port; 143. third smoke ejection port; 144. fourth smoke ejection port; 150. smoke ejection air knife; 151. right air knife of upper furnace portion; 152. left air knife of upper furnace portion; 153. air knife outlet; 160. incrementer; 161. Venturi channel; 162. contraction section; 163. gap; 164. incrementer outlet;
200. heating furnace section; 201. upper furnace portion of the heating section; 202. lower furnace portion of the heating section; 210. infrared burner; 2111. cover plate; 2112. air inlet; 2113. heat release port; 2114. inner cylinder; 2115. premixing area; 212. cooling interlayer; 2121. outer cylinder; 2122. cooling inlet; 2123. cooling outlet; 218. anti-flashback area; 219. combustion area; 213. heat-insulating material plate; 214. porous medium material layer; 2151. thermocouple; 2152. heat preservation material layer; 2153. heat-insulating material support layer; 2154. bottom heat-insulating panel; 2155. pressing mechanism; 2156. bottom panel; 2157. stiffener; 2161. combustion-supporting air duct; 2162. combustion-supporting fan; 2163. first branch; 2164.

second branch; 2165. air-gas mixer; 2171. cooling water tank; 2712. hot water tank; 220. airflow stirring device;

300. soaking furnace section; 310. air duct; 311. centrifugal fan; 3121. air-blowing air duct section; 31211. first air duct portion; 31212. second air duct portion; 3122. air-suction air duct section; 313. air outlet; 314. air suction port; 320. heater; 321. heating part; 330. soaking-section upper furnace portion; 340. soaking-section lower furnace portion; 350. receiving cavity; 351. bottom wall; 352. top wall; 353. sidewall;

400. furnace section lifting apparatus

DETAILED DESCRIPTION

In the description of the present application, it is to be understood that the orientation or position relationships indicated by terms "center", "longitudinal", "lateral", "length", "width", "thickness", "above", "below", "front", "back"," "left", "right", "vertical", "horizontal", "top", "bottom", "inside", "outside", "clockwise", "counterclockwise", "axial", "radial", "circumferential", etc. are based on the orientation or position relationships shown in the drawings, merely for facilitating description of the present application and simplifying description, and do not indicate or imply that the apparatus or element referred to has a specific orientation and is constructed and operated in a specific orientation, and thus it is not to be construed as limiting the present application.

In addition, a feature defined as a "first" feature or a "second" feature may explicitly or implicitly include one or more of such features, which are used for distinguishing and describing the features, and there is no order or importance. In the description of the present application, "multiple" means two or more unless otherwise noted.

In the description of the present application, it is to be noted that unless otherwise expressly specified and limited, the term "mounted", "connected to each other" or "connected" should be construed in a broad sense as securely connected, detachably connected or integrally connected; mechanically connected or electrically connected; directly connected to each other or indirectly connected to each other via an intermediary; or intraconnected between two components. For those of ordinary skill in the art, specific meanings of the preceding terms in the present application may be understood based on specific situations.

Referring to FIG. 1 to FIG. 11, embodiments of the present application provide a glass tempering furnace 10. The glass tempering furnace 10 includes a preheating furnace section 100, a heating furnace section 200, and a soaking furnace section 300 that are disposed in sequence along the glass traveling direction of glass 20.

In some embodiments of the present application, the preheating furnace section 100 has a feed port. A general smoke vent 120 is disposed adjacent to the feed port.

In the related art, the general smoke vent is generally disposed on a heating section. In the present application, the smoke vent of the heating section is moved forward to the position of the feed port of the preheating section. On the one hand, smoke is moved from the heating section to the preheating section to serve as the heat source of the preheating section. On the other hand, the smoke vent is spaced a certain distance from the heating section, reducing the impact of smoke release on the temperature field of the heating section.

In some embodiments of the present application, the preheating furnace section 100 is divided into multiple sections along the glass traveling direction of the glass 20. Each section has a smoke suction port 130 and a smoke ejection port 140. The smoke suction port 130 is configured to suck smoke from the heating furnace section. The smoke suction port 130 is configured to suck smoke from the heating furnace section 200. The smoke ejection port 140 is configured to deliver the sucked smoke to the preheating furnace section.

In the related art, utilizing a "chimney effect", smoke generated by a heating section of a glass tempering furnace is released by a smoke suction port disposed at the entrance of the furnace and a chimney connected to the smoke suction port.

In the present application, the preheating furnace section 100 is disposed before the heating furnace section 200. The general smoke vent 120 of the whole equipment is disposed at the entrance of the preheating section. Moreover, along the glass traveling direction, a smoke suction port 130 is disposed on each section of the preheating furnace section 100, the smoke in the furnace is sucked out though each smoke suction port 130 by a fan, and then the sucked smoke is delivered to the furnace through the smoke ejection port 140 of each section of the preheating furnace section 100, so that the internal gas circulation in the preheating furnace section 100 is established. In this manner, it is achieved that the pressure in the furnace maintain a preset target of "slightly positive pressure", and then it is achieved that the gas in the furnace generally flows from the heating furnace section 200 to the preheating furnace section 100.

In an actual working process, each section of the preheating furnace section 100 has a smoke suction port 130. Smoke in the furnace can be sucked out through each smoke suction port 130 by a fan. In this manner, pressure in the heating furnace section 200 decreases so that pressure in the heating furnace section 200 is greater than pressure in the preheating furnace section 100. Meanwhile, smoke in the heating furnace section 200 enters the preheating furnace section 100 under the action of a pressure difference. Then the sucked smoke is delivered to the preheating furnace section 100 through each smoke ejection port 140. In this manner, smoke in the furnace generally flows from the heating furnace section 200 to the preheating furnace section 100 recurrently.

With the preheating furnace section 100, on the one hand, smoke in the heating furnace section 200 can be reused; on the other hand, the preheating furnace section 100 is divided into multiple sections, smoke is sucked out through the smoke suction ports 130 and delivered through the smoke ejection ports 140 so that the temperature of the glass 20 in the preheating furnace section 100 can rise in a stepped manner. Heat of the preheating furnace section 100 comes from smoke of the heating furnace section 200, and considering the continuous entry of the glass 20 as a cold source, the temperature of the drive rollers 101 of the preheating furnace section 100 is far lower than the temperature of the drive rollers 101 of the heating furnace section 200. In this manner, it can effectively avoid deformation (upward warping) and vibration caused by an excessive temperature difference between the upper surface of the glass 20 and the lower surface of the glass 20 due to excessive temperature of the drive rollers 101 in the initial stage in which the glass 20 enters the heating furnace section.

In the present application, the soaking furnace section 300 is disposed after the heating furnace section 200, which further ameliorates the temperature non-uniformity on the surface of the glass 20 in the heating stage and satisfies higher-standard uniformity requirements, thereby further improving the tempering quality of the glass 20, particularly satisfying tempering requirements of coated glass and Low-E glass with high-standard uniformity requirements.

In a conventional glass tempering furnace of the related art, it is necessary to address the problem of upward warping and vibration caused by non-uniform heating of the glass in the heating section at the initial stage. The glass tempering furnace 10 of the present application is completely different from a conventional glass tempering furnace in the related art. In the glass tempering furnace 10 of the present application, the preheating furnace section 100 is independently established, smoke in the heating section is used as the heat source, and the preheating section is independently established, cooling down the temperature of the ceramic rollers in the preheating section. The glass 20 is preheated in a forced convection manner, solving the problem of warping and vibration caused by non-uniform heating of the glass 20 in the initial stage.

In some embodiments of the present application, the preheating furnace section 100 is divided into three sections in the glass traveling direction. The preheating furnace section 100 is divided into a preheating-section upper furnace portion 102 and a preheating-section lower furnace portion 103. The preheating-section upper furnace portion 102 is disposed above the drive rollers 101. The preheating-section lower furnace portion 103 is disposed below the drive rollers 101.

Figure 2:
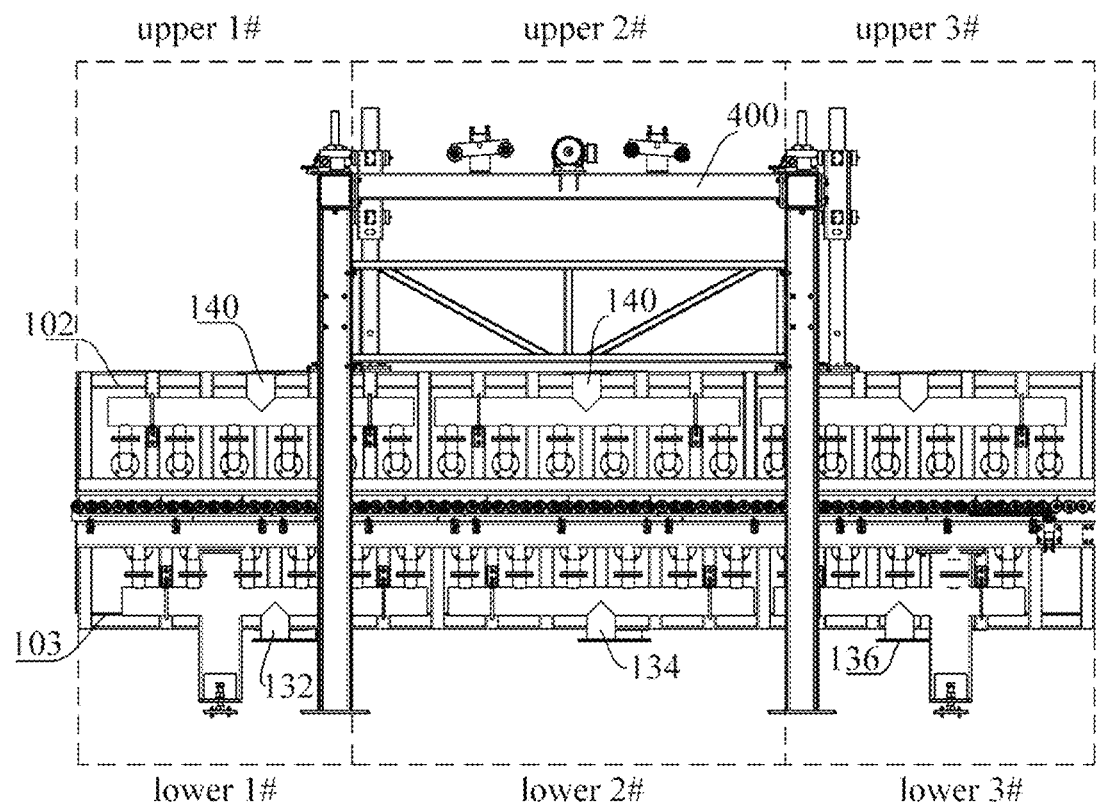
FIG. 2 illustrates a preheating furnace section of the glass tempering furnace at a first angle of view according to an embodiment of the present application.
Figure 3:
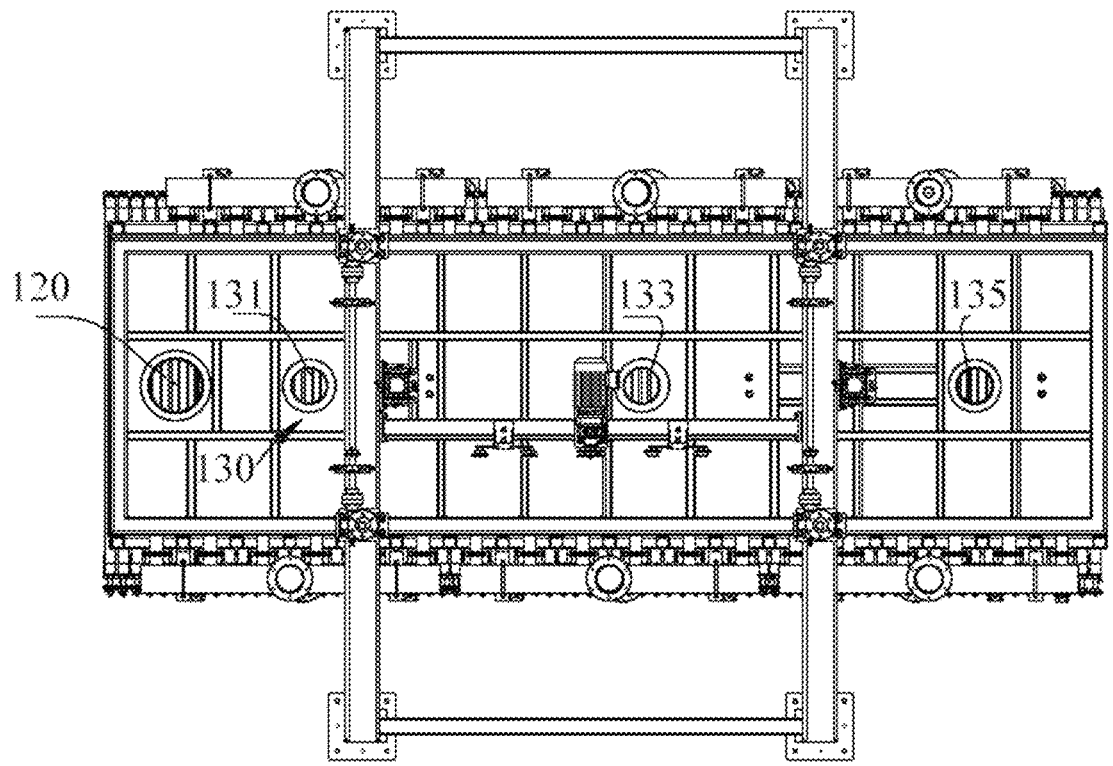
FIG. 3 illustrates the preheating furnace section of the glass tempering furnace at a second angle of view according to an embodiment of the present application.

Referring to FIG. 2 and FIG. 3, the preheating furnace section 100 is divided into six sections: upper 1 #, lower 1 #, upper 2 #, lower 2 #, upper 3 #, and lower 3 #. Each of the six sections is provided with a smoke suction port 130, and the smoke in the furnace is sucked out by a fan through the smoke suction ports 130, and then the sucked smoke is delivered to the furnace through the smoke ejection port 140 of each of the six sections, thereby establishing an internal smoke circulation in the furnace.

Referring to FIG. 2 and FIG. 3, in the preheating furnace section 100, a first smoke suction port 131 is disposed on upper 1 #, a second smoke suction port 132 is disposed on lower 1 #, a third smoke suction port 133 is disposed on upper 2 #, a fourth smoke suction port 134 is disposed on lower 2 #, a fifth smoke suction port 135 is disposed on upper 3 #, and a sixth smoke suction port 136 is disposed on lower 3 #.

In an embodiment, taking the upper 1 # as an example, the first smoke suction port 131 of the upper 1 # is connected to the suction port of a smoke suction fan. Smoke in the furnace is sucked out by the smoke suction fan. By dividing the pipeline into two, the sucked smoke is delivered to the first smoke ejection port 141 and the second smoke ejection port 142 of upper 1 #. Similarly, in lower 1 #, the second smoke suction port 132 is connected to the suction port of a smoke suction fan, and smoke in the furnace is sucked out by the smoke suction fan. By dividing the pipeline into two, the sucked smoke is delivered to the third smoke ejection port 143 of lower 1 # and the fourth smoke ejection port 144 of lower 1 #.

In some embodiments of the present application, multiple smoke ejection air knives 150 are disposed on upper and lower sides of the drive rollers 101 along the glass traveling direction in the preheating furnace section, and the smoke ejection air knives 150 on upper and lower sides of the drive rollers 101 are staggered with the drive rollers 101 in the height direction. The smoke ejection port 140 is configured to deliver the sucked smoke to the smoke ejection air knives 150.

Figure 4:
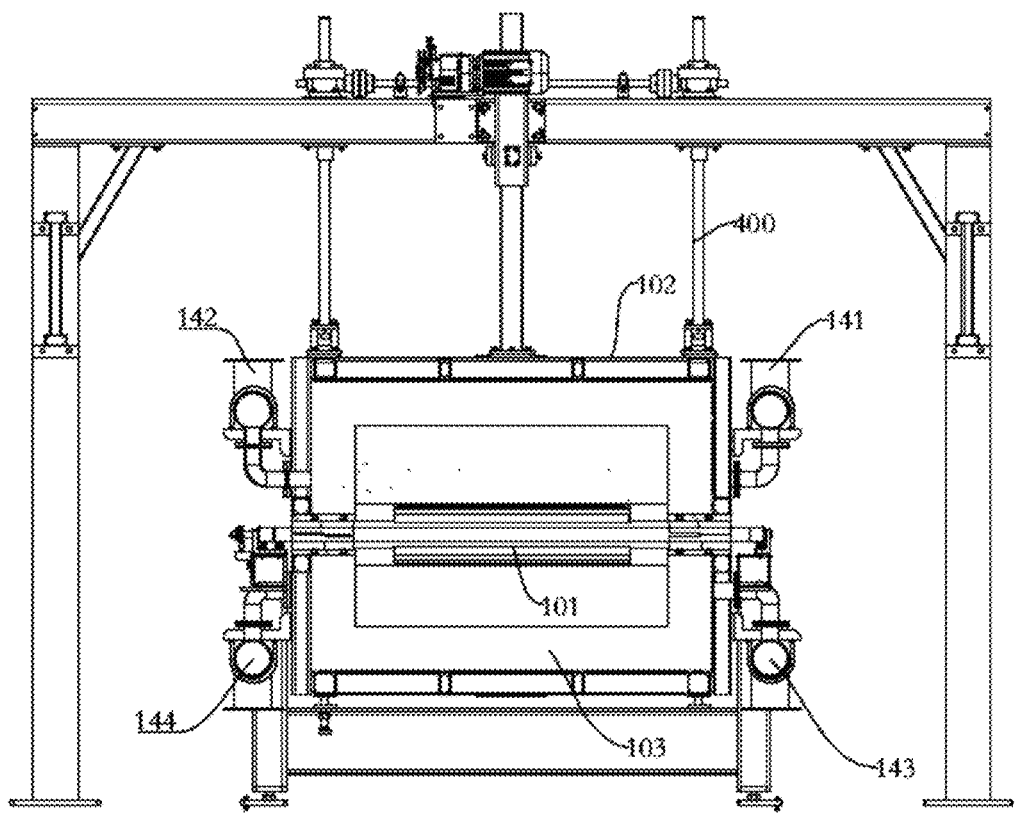
FIG. 4 illustrates the preheating furnace section of the glass tempering furnace at a third angle of view according to an embodiment of the present application.

Referring to FIG. 2 to FIG. 4, in an embodiment, each of upper 1 #, lower 1 #, upper 2 #, lower 2 #, upper 3 #, and lower 3 # of the preheating furnace section 100 is provided with multiple smoke ejection air knives 150.

In some embodiments of the present application, the diameter of the air knife outlet 153 of each smoke ejection air knife 150 is contracted.

In some embodiments of the present application, an incrementer 160 is disposed in the preheating furnace 100. The incrementer 160 has a channel 161 with a Venturi structure. The channel 161 is connected to the air knife outlet 153 of each smoke ejection air knife 150.

Figure 6:
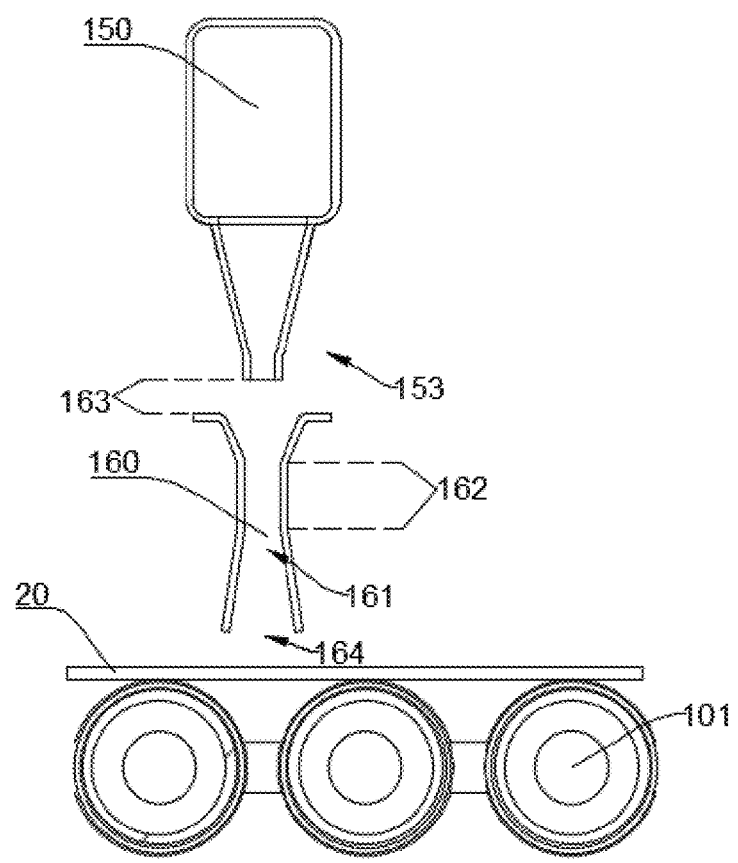
FIG. 6 is an enlarged view of the smoke ejection ports and an incrementer of the preheating furnace section of the glass tempering furnace according to an embodiment of the present application.
Figure 11:
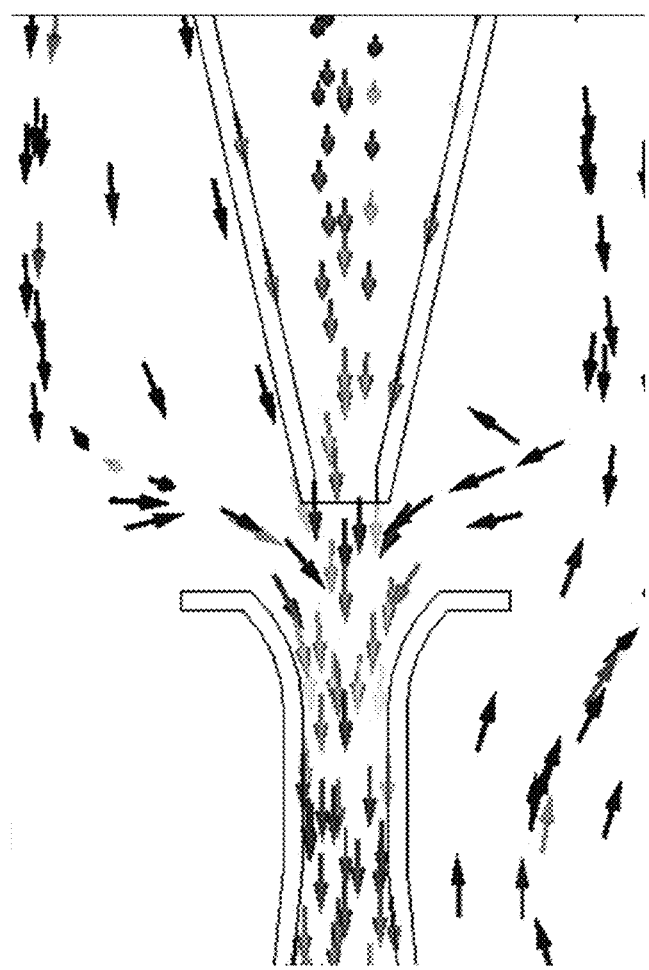
FIG. 11 illustrates a flow field analysis of the present application.
Figure 12:
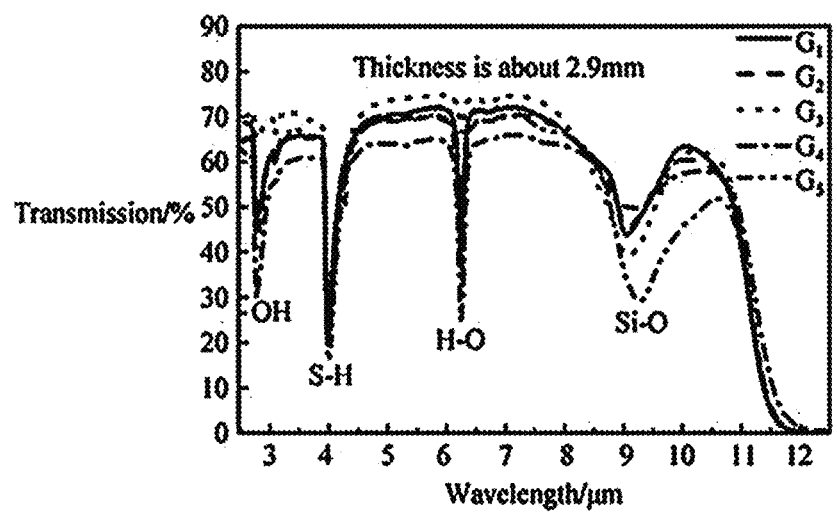
FIG. 12 illustrates an infrared transmittance curve of glass according to an embodiment.
Figure 13:
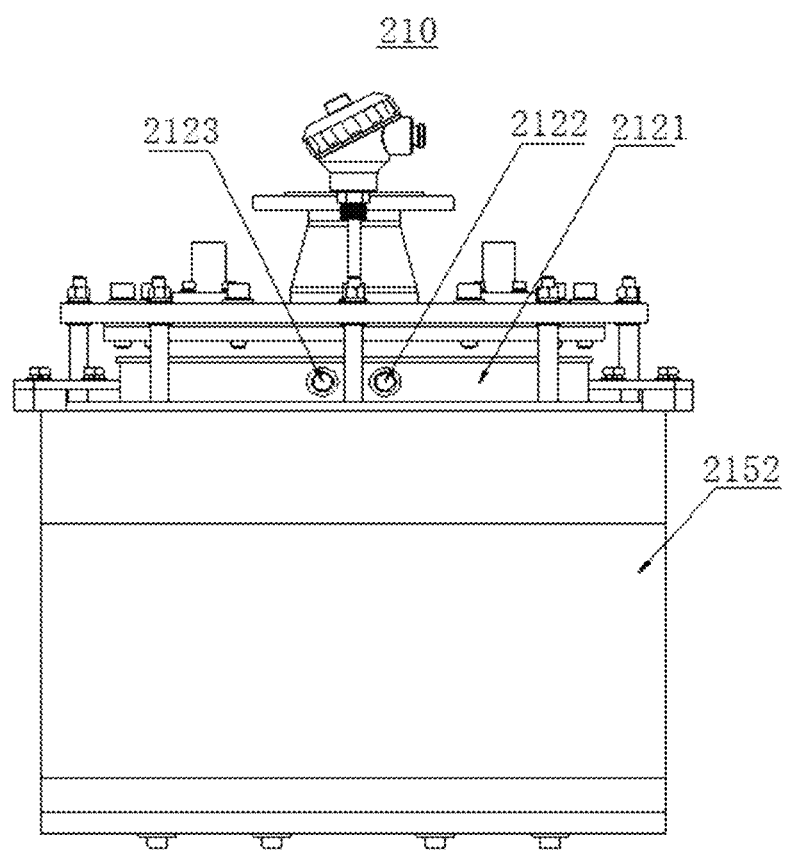
FIG. 13 illustrates a porous medium burner according to an embodiment of the present application.
Figure 14:
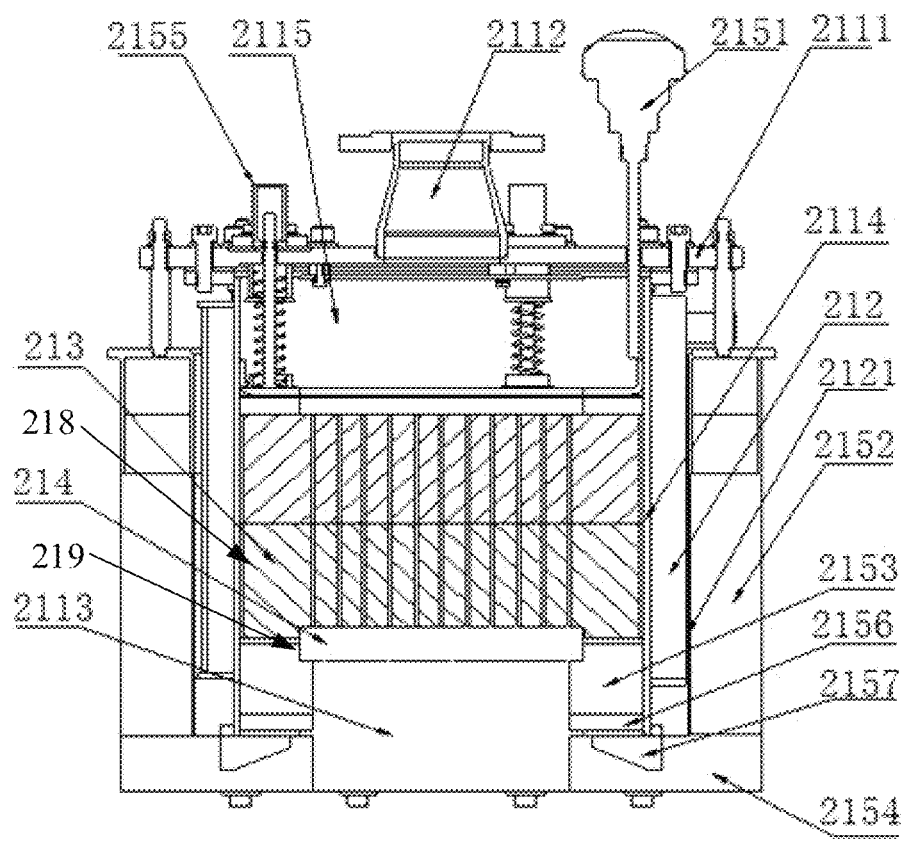
FIG. 14 is a section view of FIG. 13.

Referring to FIG. 6 and FIG. 11, with the arrangement of the channel 161 with a Venturi structure in the incrementer 160, the Venturi effect is generated, an "increment" effect is formed and the amount of air blown to the glass 20 is amplified by providing. According to a flow field simulation analysis and an actual experimental verification, the incrementer 160 of the present application greatly enhances the heating effect.

In the related art, a smoke ejection structure is typically a "circular hole staggered arrangement type" or a "slit-type" smoke ejection structure. The present application provides a structure with an "increment" effect, increasing the amount of ejected smoke and enhancing the heating efficiency.

Figure 5:
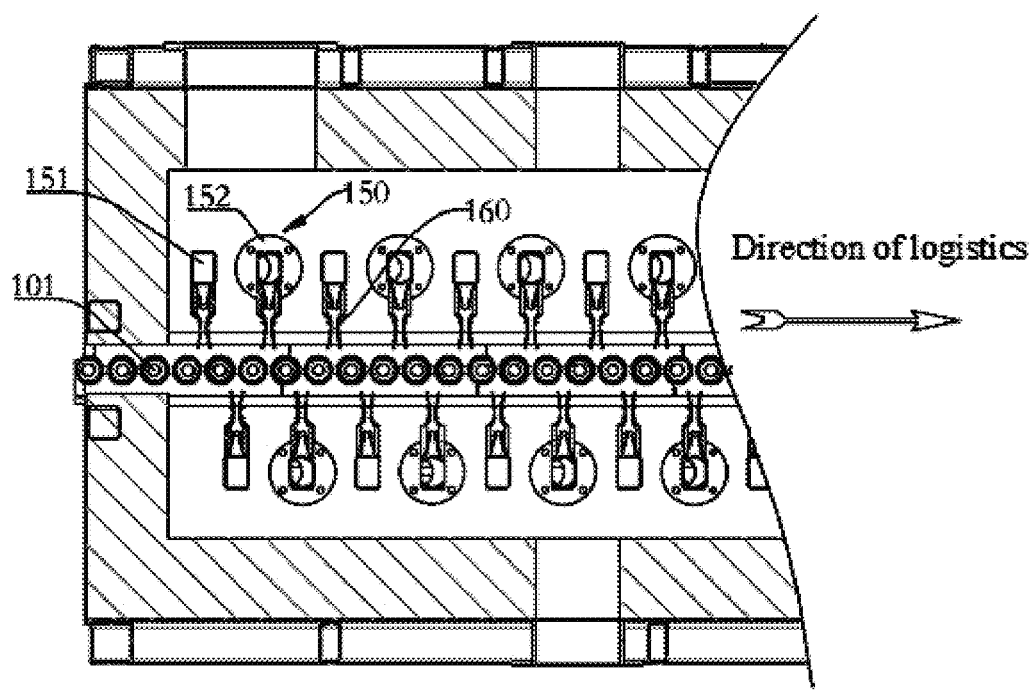
FIG. 5 illustrates smoke ejection ports of the preheating furnace section of the glass tempering furnace according to an embodiment of the present application.

Illustratively, referring to FIGS. 5-6, in the illustrated embodiment, FIG. 5 and FIG. 6 show the incrementer structure in the preheating furnace section 100. In the stage in which the empty furnace is heated up, the drive rollers 101 in the furnace are cold; and to prevent high-temperature smoke from directly ejecting onto the surface of the drive rollers 101, the smoke ejection air knives 150 do not blow directly onto the drive rollers 101, and the smoke ejection air knives 150 are staggered with the drive rollers 101 to blow smoke toward the gaps between the drive rollers 101. As shown in FIG. 5 and FIG. 6, the interior of the preheating furnace section 100 is mainly composed of drive rollers 101, right air knives 151 of the upper furnace portion, left air knives 152 of the upper furnace portion, and incrementers 160. The glass 20 travels from left to right under the rotation of the drive rollers 101. The fan sucks smoke in each section of the preheating furnace section 100, and the preheated smoke is delivered to each smoke ejection air knife 150 through each smoke ejection port 140 outside the furnace. Each smoke ejection air knife 150 designed specially and structurally contracts at a respective air knife outlet 153. Each incrementer 160 is mounted at a preset distance away from a respective air knife outlet 153. Each incrementer 160 is specially designed to produce an "increment" effect and amplify the amount of air blown to the glass 20. According to a flow field simulation analysis and an actual experimental verification, each incrementer 160 greatly enhances the heating effect.

In an embodiment, referring to FIG. 6, smoke ejected from the smoke ejection air knife 150 flows faster and forms a low-pressure area when passing the contraction section 162 of the incrementer 160. Under the action of the low-pressure area, smoke in the preheating furnace section 100 is sucked from the gap 163 between the smoke ejection air knife 150 and the incrementer 160 into the incrementer 160. Two gas flows converge at the incrementer outlet 164 and are ejected to the heated surface of the glass 20. In this manner, a greater gas ejection to the heated surface of the glass 20 is achieved under the same fan power conditions.

In some embodiments of the present application, the heating furnace section 200 is disposed after the preheating furnace section 100 along the glass traveling direction.

Figure 7:
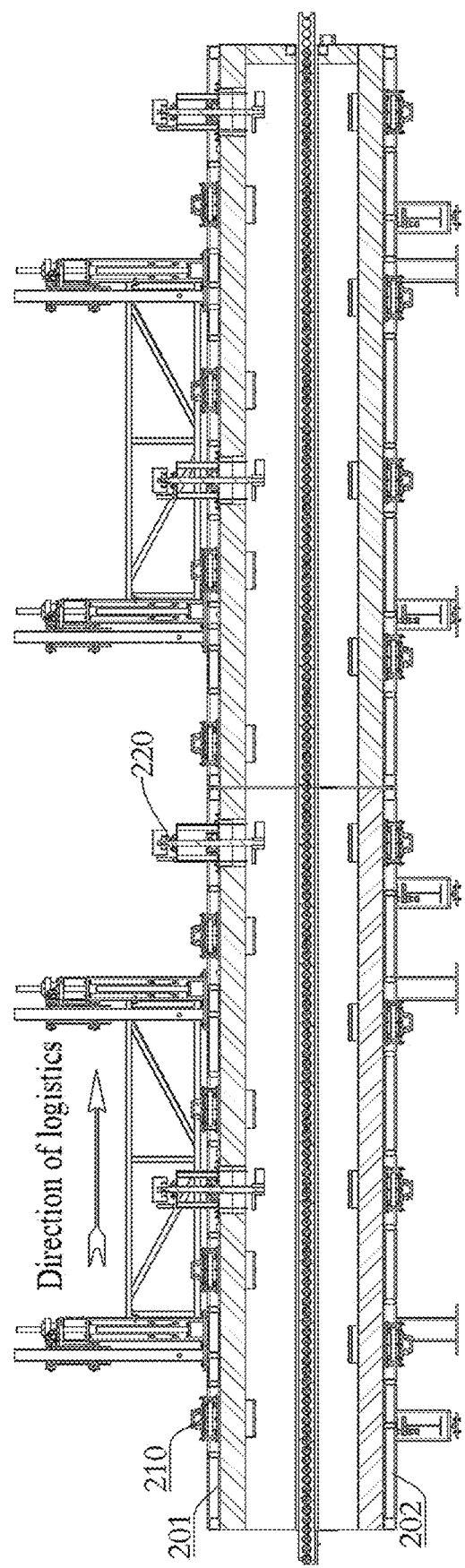
FIG. 7 illustrates a heating furnace section of the glass tempering furnace at a first angle of view according to an embodiment of the present application.
Figure 8:
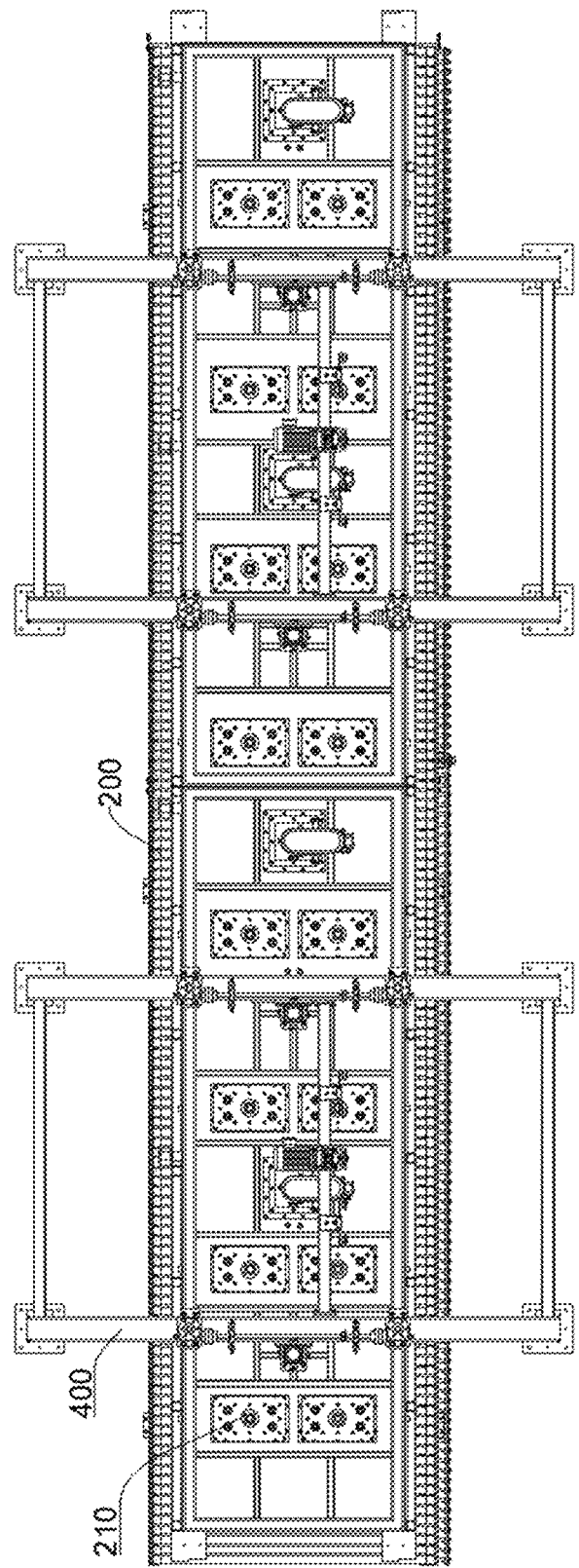
FIG. 8 illustrates the heating furnace section of the glass tempering furnace at a second angle of view according to an embodiment of the present application.

In some embodiments of the present application, referring to FIG. 7 and FIG. 8, the heating furnace section 200 is divided into an upper furnace portion of the heating section 201 and a lower furnace portion of the heating section 202. The upper furnace portion of the heating section 201 is disposed above the drive rollers 101. The heating-section lower furnace portion 202 is disposed below the drive rollers 101.

In some embodiments of the present application, the heating furnace section 200 is provided with multiple infrared burners 210. Each infrared burner 210 is a porous medium burner.

The heating furnace section 200 of the present application uses a porous medium combustion technology mainly based on infrared radiation. Three heat exchange modes: convection, heat conduction, and radiation are used to make the temperature of the combustion area 219 approximately uniform and make the temperature gradient relatively stable. The heating furnace section 200 of the present application uses a porous medium combustion technology to construct a wideband infrared heating section to heat the glass rapidly and uniformly. In this manner, the glass tempering furnace of the present application is applicable to not only ordinary glass but also coated glass and Low-E glass.

The porous medium combustion technology enables stable combustion and a high volume thermal strength. Compared with free combustion, porous medium combustion has the advantages of high combustion rate, good combustion stability, large load adjustment range, large volume thermal strength, small burner volume, good gas adaptability, low pollutant discharge from smoke, wide combustion limit, and low combustible heat value.

In the art, a heating furnace uses gas fuel whose combustion is featured by free flame. This type of combustion requires a large space, has a large temperature gradient around the flame, and easily generates a high local temperature. Nitrogen oxide (NOX) generation becomes noticeable when the temperature is higher than 1500° C. Because of the highly toxic property of nitrogen oxide (NOx), reducing NOx emission is also very important.

Compared with conventional free-flame combustion in a heating furnace of the related art, porous medium combustion in the heating furnace section 200 of the present application greatly improves the combustion efficiency. In the combustion process, a porous medium plays a key role. Porous medium materials have the following features: superior heat transfer properties, forced gas flow in and out, separation and convergence, enhanced convection, uniform temperature distribution, and low temperature level, reducing pollutant emission; low volume density, namely low thermal inertia, enabling a rapid temperature rise during startup and quick adaptation to load changes; and being operable within a temperature range of 800° C. to 1200° C.

In some embodiments of the present application, each infrared burner 210 of the heating furnace section 200 uses a porous medium material as the main combustion component, and gas is burned in the porous medium material. The porous medium material of the present application is SiC. The radiation rate of SiC is about 0.9, far higher than the radiation rate of a common metal alloy heating material, and thus has a better radiation heating effect. Each infrared burner 210 of the heating furnace section 200 of the present application uses SiC as a porous medium material, improving the heating effect.

The heating furnace section 200 of the present application uses infrared burners 210 whose core technology is porous medium combustion.

In some embodiments of the present application, in the heating furnace section 200, the infrared burners 210 are staggered on upper and lower sides of the drive rollers 101 along the glass traveling direction.

Referring to FIG. 7, in the illustrated embodiment, in the heating furnace section 200, each infrared burner 210 in the upper furnace portion of the heating section is staggered with each infrared burner 210 in the lower furnace portion of the heating section in the glass traveling direction.

In the heating furnace section 200, the infrared burners 210 are staggered on upper and lower sides of the drive rollers 101 along the glass traveling direction so that the heating uniformity can be improved.

In some embodiments of the present application, airflow stirring devices 220 are disposed in the heating furnace section 200 and spaced from the infrared burners 210 along the glass traveling direction.

A drawback of infrared radiation is the inability to ensure uniform radiation across the entire surface of the object, resulting in a projected intensity distribution of the infrared radiation source on the surface that requires to be heated. The airflow stirring devices 220 are disposed in the heating furnace section 200 to cooperate with the infrared burners 210. The airflow stirring devices 220 are spaced from the infrared burners 210. The airflow stirring devices 220 can stir smoke in the furnace, avoiding local concentration of high-temperature smoke in the furnace and thus avoiding non-uniform furnace temperature; and enabling the stirred smoke to flow on the surface of the glass 20 at a preset speed and thus increasing convective heat transfer.

In an embodiment, referring to FIG. 7 and FIG. 8, the main structure of the heating furnace section 200 is shown, and the infrared burners 210 are staggered along the glass traveling direction 20 to avoid a temperature field non-uniformity caused by heat concentration. From the perspective of temperature control, the heating furnace section 200 is divided into four areas, and each area is equipped with an airflow stirring device 220. As shown in FIG. 8, in the furnace width direction, the infrared burners 210 are arranged on two sides of each area.

In some embodiments of the present application, multiple air ducts 310 are disposed in the soaking furnace section 300 and configured to generate horizontally parallel airflow on the upper and lower surfaces of the glass 20. Specifically, the soaking furnace section 300 includes a receiving cavity 350 and air ducts 310. In an embodiment, the drive rollers 101 are disposed on the bottom wall 351 of the receiving cavity 350 and configured to drive the glass 20.

Glass "tempering" involves a "heating" process and a "cooling" process. If the surface temperature uniformity of the glass is not well ensured before the rapid cooling process, a serious quality problem occurs during the rapid cooling process.

As mentioned in the background, in a related art, forced convection is generally provided in the heating section. In this manner, when the glass is softened at a high temperature, the airflow with a certain speed and pressure to will form streaks on the surface of the softened glass. This problem is solved in the present application where horizontal parallel airflow is created in the soaking section.

In addition to the preceding disadvantage of the forced convection, for direct-fired gas heating, the high-speed airflow in the furnace seriously affects the porous medium burners.

The thermal conductivity of the glass is very low. To homogenize the temperature of the glass within a specified period of time on the premise that the productivity is satisfied, it is necessary to improve the convective heat transfer efficiency/capability. For the airflow soaking technology, to ensure the temperature uniformity of the product, one of the following two conditions must be satisfied:
(1) fully turbulent airflow
(2) uniform horizontal airflow Fully turbulent airflow requires a powerful fan. Such airflow is not conducive to the stability of light and thin glass on drive rollers 101. Moreover, impurities on the insulation materials in the furnace and impurities in the furnace chamber are carried by the turbulent airflow and cover the entire furnace chamber and the surface of the glass, causing the quality of the surface of the glass to be out of control.

In the present application, the soaking furnace section 300 for forced convection of horizontal parallel airflow delivered in the subsequent after the heating furnace section 200, which serves as the final heating and temperature adjustment process. The required power in this process is far smaller than the power of the heating section. Therefore, the power output of the heater 320 is required to respond fast and continuously adjustable. In the present application, the heat source of the soaking furnace section 300 is an electric tubular heater integrated box that is plugged into the air duct.

Figure 9:
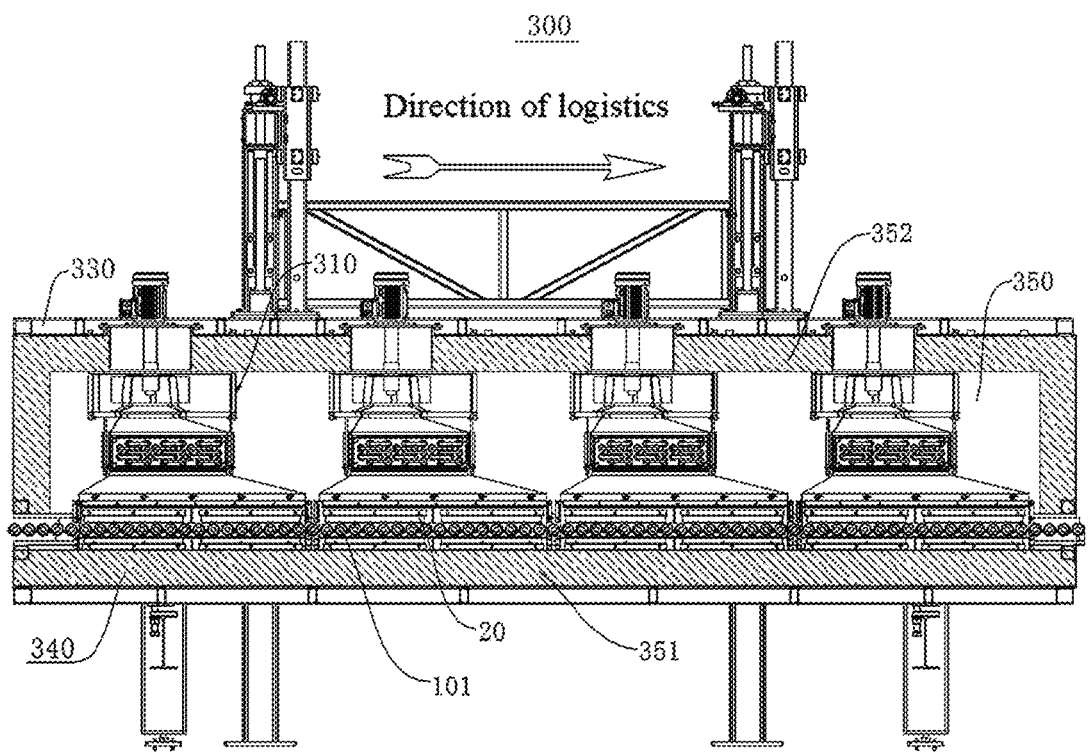
FIG. 9 illustrates a soaking furnace section of the glass tempering furnace according to an embodiment of the present application.
Figure 10:
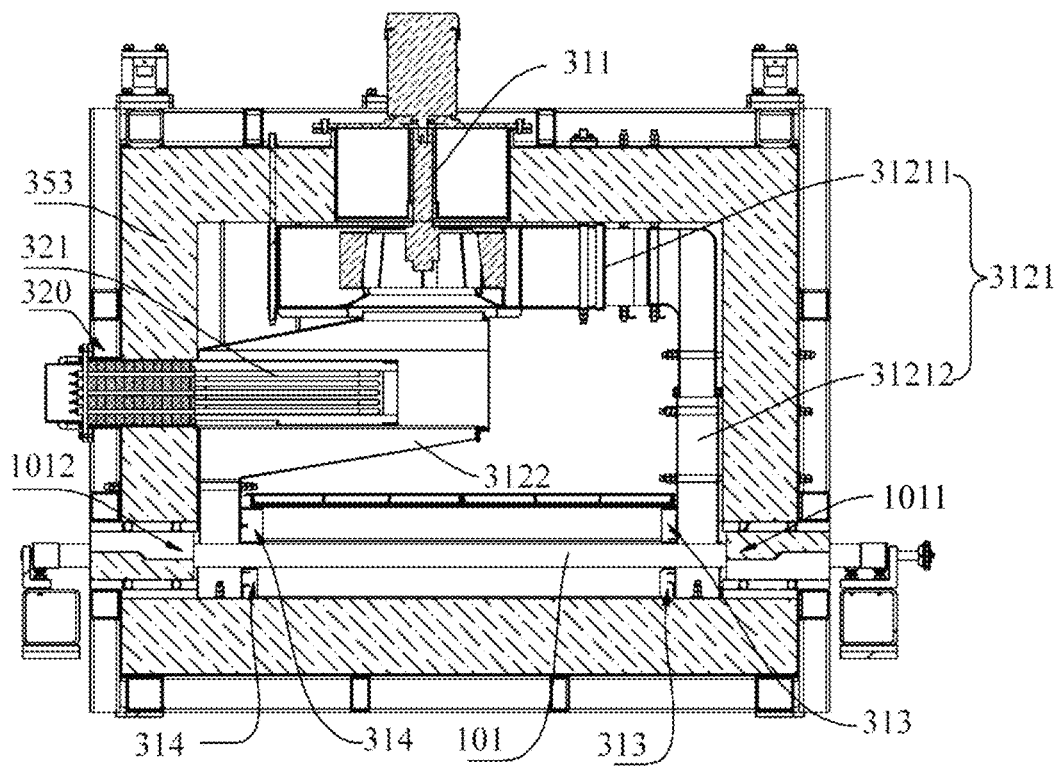
FIG. 10 is a section view of a single air duct of the soaking furnace section of the glass tempering furnace taken along the width direction of the furnace section according to an embodiment of the present application.

In some embodiments of the present application, referring to FIG. 9 and FIG. 10, the soaking furnace section 300 is divided into multiple sections. Illustratively, the soaking furnace section 300 is divided into four sections, and each section has an independent air duct 310.

In one embodiment, the four sections of air ducts 310 are disposed in the receiving cavity 350. Each air duct 310 has air outlets 313 and air suction ports 314. The air outlets 313 are respectively disposed above and below the drive rollers 101 and at a first end 1011 of the drive rollers 101 along the radial direction of the drive rollers 101 to enable air blown out from the air outlet 313 to reach the first end 1011 of the drive roller 101, blow out from the gap between adjacent drive rollers 101, and blow over the upper and lower surfaces of the glass 20 along a direction parallel to the drive roller 101s.

In an embodiment, the air suction ports 314 are respectively disposed above and below the drive rollers 101, and adjacent to a second end 1012 of the drive rollers 101 and each of the air suction ports 314 is configured to suck the gas blowing over the upper and lower surfaces of the glass 20.

In the soaking furnace section 300 of the present application, air blown from the air outlet 313 can reach the first end 1011 of the drive roller 101, blow out from the gap between adjacent drive rollers 101, and blow over the upper and lower surfaces of the glass 20 parallel to the drive roller 101. In this manner, air can sweep across horizontally in parallel to the upper and lower surfaces of the glass 20 to complete heat exchange with the glass 20. This horizontally parallel soaking mode can greatly improve the non-uniform heating temperature of the surface of the workpiece.

In some embodiments of the present application, each air duct 310 includes a centrifugal fan 311 and an air duct body. The centrifugal fan 311 is configured to rotate to suck the air in and to throw the air out, so that the air flows in the air duct body, is blown out from the gap between adjacent drive rollers 101, and sweeps across horizontally in parallel to the upper and lower surfaces of the glass 20 to complete heat exchange with the glass 20. In an embodiment, the air duct body includes an air-suction air duct section 3122 and an air-blowing air duct section 3121. A first end of the air-blowing air duct section 3121 is connected to the outlet of the centrifugal fan 311. An air outlet 313 is disposed at a second end of the air-blowing air duct section 3121. A first end of the air-suction air duct section 3122 is connected to the inlet of the centrifugal fan 311. A second end of the air-suction air duct section 3122 is provided with an air suction port 314.

A first end of the air-blowing air duct section 3121 is connected to the outlet of the centrifugal fan 311. An air outlet 313 is disposed at a second end of the air-blowing air duct section 3121. When the centrifugal fan 311 rotates at a high speed, air is sucked in from the inlet of the centrifugal fan 311, is thrown out in the tangent direction into the air-blowing air duct section 3121, passes through the air-blowing air duct section 3121, and reaches the air outlet 313. Air blown out from the air outlet 313 reaches the first end 1011 of the drive roller 101, collides with the sidewall surface of the first end 1011, changes direction, is blown out from the gap between the adjacent drive rollers 101, and blow over the upper and lower surfaces of the glass 20 in parallel to the drive rollers 101, thereby realizing horizontally and parallelly soaking the workpiece.

In an embodiment, referring to FIG. 9 and FIG. 10, the receiving cavity 350 is hexahedral. The drive rollers 101 are disposed above the bottom wall 351. The centrifugal fan 311 is disposed on the top wall 352. The inlet of the centrifugal fan 311 is located at the bottom of the centrifugal fan 311. When the drive rollers 101 drive the workpiece, the inlet of the centrifugal fan 311 is located above the workpiece.

In an embodiment, the air-blowing air duct section 3121 includes a first air duct portion 31211 and a second air duct portion 31212. The first air duct portion 31211 is parallel to the drive roller 101. The second air duct portion 31212 is perpendicular to the drive roller 101. The air outlet 313 is disposed on a sidewall surface of the second air duct portion 31212 facing the first end 1011 of the drive roller 101.

In an embodiment, referring to FIG. 9 and FIG. 10, the first air duct portion 31211 is disposed on the top wall 352 relative to the drive roller 101. The second air duct portion 31212 is disposed on the sidewall 353 of the receiving cavity 350.

In an embodiment, a first end of the first air duct portion 31211 is connected to the outlet of the centrifugal fan 311, a second end of the first air duct portion 31211 is connected to the inlet of the second air duct portion 31212, and a second end of the second air duct portion 31212 is the air outlet 313.

In an embodiment, the first air duct portion 31211 and the second air duct portion 31212 are square.

In some implementations, the first end of the first air duct portion 31211 communicating with the outlet of the centrifugal fan 311 has a small size, and the second end of the first air duct portion 31211 has a large size, so that the first air duct portion 31211 is approximately trumpet-shaped. The size of the inside channel of the second air duct portion 31212 is set according to the length of the soaking furnace section 300. The size of the inside channel of the second air duct portion 31212 determines the coverage width of the blown air, that is, the width of the air blowing over the workpiece.

In some embodiments of the present application, the inlet of the centrifugal fan 311 is disposed below the impeller of the centrifugal fan 311.

In some embodiments of the present application, the soaking furnace section 300 also includes a heater 320. The heater 320 is configured to heat air that has completed heat exchange to a preset temperature. The heater 320 is disposed below the impeller of the centrifugal fan 311 so that air sucked in by rotation of the impeller passes through the heater 320 and then enters the impeller of the centrifugal fan 311. The air blowing over the upper and lower surfaces of the workpiece completes heat exchange with the workpiece. At this time, the temperature of the air decreases, and the air passes though the heater 320 and can be heated to the preset temperature again.

The temperature of such air heated by the heater 320 is not uniform. In this embodiment, air heated by the heater 320 is sucked into the centrifugal fan 311 again and stirred by the impeller of the centrifugal fan 311. In this manner, the non-uniform air that has been heated by the heater 320 is fully stirred and dispersed so that the temperature of the air is homogenized. The homogenized air is sucked into the air duct 310 again by the centrifugal fan 311 rotating at high speed to equalize the heat of the workpiece, thereby making cyclic heat-balance possible, and thus facilitating energy conservation and emission reduction.

Referring to FIG. 9 and FIG. 10, in an embodiment, the heater 320 is disposed on the sidewall 353 of the receiving cavity 350 opposite to the second air duct portion 31212.

In some embodiments of the present application, the first end of the air-suction air duct section 3122 of the soaking furnace section 300 is connected to the inlet of the centrifugal fan 311, and the air suction port 314 is disposed at the second end of the air-suction air duct section 3122.

In some embodiments of the present application, the heating part 321 of the heater 320 is disposed in the air-suction air duct section 3122.

The heating part 321 of the heater 320 is disposed in the air-suction air duct section 3122 so that air blowing over the upper and lower surfaces of the glass 20 can be heated by the heating part 321 of the heater 320 when passing through the air-suction air duct section 3122, thereby improving the heating efficiency and reducing the energy consumption.

The first end of the air-suction air duct section 3122 of the soaking furnace section 300 is connected to the inlet of the centrifugal fan 311, and the air suction port 314 is disposed at the second end of the air-suction air duct section 3122. Thus, air blowing over the upper and lower surfaces of the glass 20 can pass through the air-suction air duct section 3122 to reach the inlet of the centrifugal fan 311, and is sucked into the centrifugal fan 311, and then can be stirred again and circulated to soak. In some embodiments of the present application, the soaking furnace section 300 includes multiple air ducts 310. The air ducts 310 are spaced apart from each other along the rotation direction of the workpiece.

In an embodiment, referring to FIG. 9 and FIG. 10, the soaking furnace section 300 has four independently controlled air ducts: a first air duct, a second air duct, a third air duct, and a fourth air duct. The lengthwise section of a single air duct in the width direction of the soaking furnace section is as shown in FIG. 10. The centrifugal fan 311 rotates at a high speed. Air is sucked in from the bottom of the impeller of the centrifugal fan 311 and is thrown out in the tangent direction. Air flows in the air duct body, is blown out from the gap between adjacent drive rollers 101 and then sweeps across horizontally in parallel to the upper and lower surfaces of the glass 20. Air blown out from each section of the air duct can cover the surfaces of the glass 20 passing through the section of the air duct and complete heat exchange with the glass 20. The temperature of the air that has completed heat exchange has dropped and can reach the specified temperature again after being heated by the heater 320 in the soaking furnace section 300. In fact, the temperature of air heated by the heater 320 in the soaking furnace section 300 is non-uniform. This non-uniform air cannot be directly blown to the glass 20. In the present application, the impeller of the centrifugal fan 311 has a stirring function. The impeller of the centrifugal fan 311 fully stirs and disperses the non-uniform air that has been heated by the heater 320 in the soaking furnace section 300 so that the temperature of the air is homogenized. The homogenized air is delivered to the air duct body again to complete the heating and temperature rise of the glass 20.

In some embodiments of the present application, the soaking furnace section 300 is divided into a soaking-section upper furnace portion 330 and a soaking-section lower furnace portion 340. The soaking-section upper furnace portion 330 is disposed above the drive rollers 101. The soaking-section lower furnace portion is disposed below the drive rollers 101.

The preheating furnace section 100, the heating furnace section 200, and the soaking furnace section 300 are each divided into an upper portion and a lower portion, facilitating mounting or removal of the drive rollers 101 and the maintenance of the device. In an embodiment, the drive rollers 101 may be ceramic rollers common in the art.

In some embodiments of the present application, each of the preheating furnace section 100, the heating furnace section 200, and the soaking furnace section 300 has a furnace section lifting apparatus 400. The furnace section lifting apparatus 400 is connected to the upper portion and configured to lift the upper portion.

In some embodiments of the present application, a glass tempering method is provided. The method is applied by the glass tempering furnace 10 of any previous embodiment to temper the glass.

In some embodiments of the present application, the method applied by the glass tempering furnace 10 of any previous embodiment to temper the glass 20 includes the following steps:
  In S1, the manual (or automated device) tiles the glass 20 in a single layer on the material layout platform to place the products;
  In S2, the glass 20 is carried by the drive rollers 101, and enters the preheating furnace section 100, where the product is preheated in the preheating furnace section 100 (at a temperature within a certain range).
  In S3, the glass 20 starts to enter the heating furnace section 200, and the product temperature rises to 600° C. to 640° C., remains at the set temperature and continues to travel after reaching the set temperature.
  In S4, the glass 20 is carried from the heating furnace section 200 to the soaking furnace section 300 and is heated and soaked by circulating gas passing the upper and lower surfaces of the glass 20. Gas that has completed heat exchange with the glass 20 that has a relatively low and non-uniform temperature is circulated to the heater 320 and heated by the heater 320. The non-uniform gas is then strongly stirred by the impeller of the centrifugal fan 311 to become homogenized. The gas passes the upper and lower surfaces of the glass 20 under the action of the centrifugal fan 311 and the air duct 310.

The beneficial effect of the glass tempering method of the present application is as follows: The method uses the preceding glass tempering furnace to temper glass, so that the method can heat the glass rapidly and evenly. The method is applicable to not only tempering of ordinary glass, but also tempering of coated glass and Low-E glass.

The glass that has been heated up and has uniform temperature can enter the next process.

Referring to FIG. 13 to FIG. 16, the preceding porous medium burner is described in detail.

According to analysis, a porous medium burner cannot be applied to a high temperature scenario for the following reasons:

(1) Compared with medium and low temperatures, a high furnace temperature brings about a considerable amount of "background radiation" in the furnace. According to radiation-related knowledge, radiation is related to the fourth power of temperature, and the background radiation capacity at a furnace temperature of 1000° C. is nearly six times that at a furnace temperature of 650° C. During the heat transfer process inside the furnace, the burner, as a high-temperature heat source, transfers heat to the furnace in the form of "thermal convection" and "radiation". The furnace also generates background radiation to the burner. This background radiation increases as the furnace temperature rises. At a high temperature, even the burner metal framework made of a heat-resistant alloy undergoes "creep". This deformation is irreversible.

(2) The structure of a porous medium burner typically involves a combination of "heat-resistant metal framework+heat-insulating material support" that confines the porous medium within the burner. This design determines that the heat at a high furnace temperature can be transferred along the metal framework of the burner. As a result, the metal wall surface of the premixing chamber where mixed combustion gas enters has an excessively high temperature and runs the risk of flareback.

Therefore, in terms of a burner based on the porous medium combustion technology in the related art, the part of the burner facing the furnace is typically a metal frame. After working for a long time, the frame undergoes various degrees of deformation. Such metal frame may lead to a serious consequence in a high-temperature scenario, so the burner cannot be used in a high-temperature furnace. To address the problem that a porous medium burner of the related art can be applied to only a low or medium furnace temperature and mostly applied to only a low furnace temperature and to broaden the application scope to a high-temperature field, the present application provides a porous medium burner applicable to a high furnace temperature environment whose original structure with a metal skeleton with cooling function is protected.

Additionally, limited by the characteristics of "premixed combustion" and "porous medium combustion", in the related art, the power adjustment ratio of a porous medium burner (the ratio of the maximum power to the minimum power for a stable operation of the burner) is typically fixed or has a narrow adjustment range. In other words, the gas flow rate remains constant, also limiting the applicability of the burner.

In the related art, the methods and characteristics of power adjustment of a thermal apparatus based on a porous medium burner are as follows:

(1) Gas combustion requires a certain amount of air. The air-fuel ratio is the ratio of air to gas, and the ratio of the two is usually fixed. By making minor adjustments to the amount of air (the air-fuel ratio), it is possible to adjust the power of an individual burner. However, the range of variation in burner power output is very narrow. Decreasing the amount of air can lead to incomplete combustion of the gas, thereby resulting in the production of toxic CO gas.

(2) The heater group is composed of multiple burner modules. The burner modules are turned on or off so that the power output of the heater group is performed. However, temperature distribution of a single heater group is non-uniform; consequently, temperature distribution of a thermal device is non-uniform, and a uniform temperature field cannot be established.

Therefore, it is required to improve the adjustment capability of a burner from a design perspective of the burner to solve the problem of fixed power and small power adjustment ratio of the burner in related technologies.

The infrared burner 210 of this embodiment includes a housing. The housing has a chamber, an air inlet 2112 and a heat release port 2113, the air inlet 2112 connected to the chamber, and the heat release port 2113 connected to the chamber. A premixing area 2115, an anti-flashback area 218, and a combustion area 219 are disposed in sequence in the chamber along the air inlet direction from the air inlet 2112 to the heat release port 2113.

The housing includes an inner cylinder 2114 and a cover plate 2111 having an air inlet 2112. The air inlet 2112 is configured to input mixed combustion gas formed of gas and combustion-support air. One or more air inlets 2112 may be provided. For example, two or three air inlets 2112 may be provided. The cover plate 2111 is disposed at one end of the inner cylinder 2114 to form the chamber. In this embodiment, the housing is made of metal, the space in the inner cylinder 2114 is cylindrical, the housing and the cover plate 2111 are square, one air inlet 2112 is provided, and is located at the center of the cover plate 2111, and the inner cylinder 2114 is fastened to the cover plate 2111 by a flange and a sealing gasket.

The main function of the premixing area 2115 is to mix and disperse the mixed combustion gas formed of gas and air entering through the air inlet 2112 so that the mixed combustion gas is further mixed and dispersed before uniformly entering the anti-flashback area 218. A gas distribution plate having distribution holes are disposed in the premixing area 2115. The gas distribution plate is connected to the housing. The orthographic projection of the air inlet 2112 is located on the gas distribution plate. In this embodiment, the orthographic projection is a projection along an air inlet direction, and the orthographic projection of the air inlet 2112 is located at the center of the gas distribution plate. After passing through the gas distribution holes of the gas distribution plate, the mixed combustion gas can be evenly distributed to the premixing area 2115 and then evenly distributed to a porous medium material layer 214 through the gas channels of a heat-insulating material layer so that the mixed gas can be uniformly burned in the porous medium material layer 214, thereby improving the uniformity of combustion and heating.

The main function of the anti-flashback area 218 is to separate the premixing area 2115 from the combustion area 219 to prevent flareback. The anti-flashback area 218 is filled with a heat-insulating material layer with gas channels. The heat-insulating material layer further fully mixes and uniformly distributes the mixed combustion gas entering from the premixing area 2115, and then conveys the mixed combustion gas to the combustion area 219 for combustion. The heat-insulating material layer has gas channels. The thickness of the heat-insulating material layer along the air inlet direction ranges from 100 mm to 200 mm. In general, the heat-insulating material layer consists of at least two layers of heat-insulating material plates 213 arranged in a stacked manner along the air inlet direction. The thickness of a single layer of heat-insulating material plate 213 ranges from 50 mm to 100 mm. Gas channels of any two adjacent layers of heat-insulating material plates 213 are correspondingly interconnected to form complete gas channels. In this embodiment, the heat-insulating material layer consists of two layers of heat-insulating material plates 213. The gas channels of the two layers of heat-insulating material plates 213 are interconnected to form complete gas channels. The complete gas channels run along the air inlet direction and arranged at the center of the heat-insulating material layer.

By machining through holes in the thickness direction of the heat-insulating material layer, the premixed gas is allowed to enter the porous medium material through these through holes. On the one hand, uniform distribution of airflow is required to be achieved by the through holes. On the other hand, the diameter and number of the through holes need to satisfy related combustion rules. In embodiments of the present application, the aperture ratio for gas channels on the heat-insulating material layer is 1% to 5%.

The heat-insulating material layer is composed of refractory material capable of withstanding temperatures from 900° C. to 1400° C., such as a ceramic plate, and may be selected according to actual requirements. This is not limited here. The diameter of each gas channel in the heat-insulating material layer ranges from 1.5 mm to 4 mm. This is not limited. In this embodiment, the diameter of each gas channel in the heat-insulating material layer is 3 mm. Moreover, the depth-to-diameter ratio of each gas channel is relatively large, typically 30:1 to 80:1, to enhance the anti-flashback effect.

When the depth-to-diameter ratio (depth/diameter) of each gas channel in the heat-insulating material layer of the anti-flash back area 218 is large enough, it is possible to decrease the gas and air simultaneously or increase the gas and gas simultaneously to adjust the power of the burner. A larger depth-to-diameter ratio can increase the pressure of the mixed combustion gas, so that making the gas flow rate is higher than the flame propagation speed without worrying about the occurrence of tempering phenomenon, and at the same time, high combustion efficiency and low pollution emission can be achieved.

The main function of the combustion area 219 is combustion. A porous medium material layer 214 is disposed in the combustion area 219. The gas channels of the heat-insulating material layer communicate with both the premixing area 2115 and the porous medium material layer 214. The porous medium material layer 214 is configured to receive and burn the mixed combustion gas mixed and dispersed in the heat-insulating material layer. The temperature of the opposite side contacting with the premixing area 2115 of the heat-insulating material layer is lower than the ignition point of the combustion gas. In this embodiment, the porous medium material layer 214 is disposed in the central area of the heat-insulating material layer. The porous medium material layer 214 has a combustion surface facing the heat release port 2113 and configured to output gas and heat. There is a certain distance between the combustion surface and the heat release port 2113. A heat-insulating material support layer 2153 configured to support heat-insulating material is provided at a position (combustion area 219) in the chamber facing the heat release port 2113. The heat-insulating material support layer 2153 has a heat release channel corresponding to the porous medium layer 214. The heat release channel communicates with the heat release port 2113.

The material of the porous medium material layer 214 includes, but is not limited to, silicon carbide (SiC). SiC has a radiation rate of about 0.9, much higher than that of a general metal alloy heating material, leading to a better radiation heating effect. Of course, the material of the porous medium material layer 214 may be another refractory material, without limitation here. The structure of the porous medium material layer 214 includes, but is not limited to, a foam structure, a honeycomb structure, or an array structure.

The porosity of the porous medium material layer 214 is 50% and 90%. Based on this, the thickness of the porous medium material layer 214 is controlled between 15 mm and 30 mm.

By controlling key data of the heat-insulating material layer and the porous medium material layer 214, the adjustment ratio of the burner is achieved from very small to a high range of 1:1 to 5:1.

According to the preceding description, the background radiation of the furnace at a high temperature is quite strong. This means that the radiation power from the furnace to the burner is also considerable. This part of radiation power to the burner is as follows: the side of the burner facing the furnace withstands high temperature and heat input. As the housing of the burner mostly uses a heat-resistant steel frame, the excellent thermal conductivity of steel determines the rapid transfer of heat throughout the metal frame of the burner. Even if the metal frame of the burner is made of heat-resistant alloy materials, the metal undergoes "creep" at a high temperature. This deformation is irreversible. Moreover, the high-temperature environment can weaken the heat insulation effect of the anti-flashback area 218, thereby reducing the anti-flashback effect. Therefore, it is necessary to maintain the overall temperature of the housing (metal frame) and the anti-flashback area 218 at a controlled level.

To control the overall temperature of the housing, a cooling interlayer 212 for receiving a cooling medium is disposed around the housing, and the cooling interlayer 212 at least wraps part of the premixing area 2115, part of the anti-flashback area 218, and part of the combustion area 219. In an embodiment, an outer cylinder 2121 is sleeved on the inner cylinder 2114, and a cooling interlayer 212 is formed between the inner cylinder 2114 and the outer cylinder 2121. In this embodiment, the inner cylinder 2114 and the outer cylinder 2121 are each cylindrical. The outer cylinder 2121 wraps most of the premixing area 2115 of the inner cylinder 2114, the entire anti-flashback area 218, and most of the combustion area 219, and only does not wrap areas at the top and bottom of the inner cylinder 2114. The two ends of the outer cylinder 2121 are each welded to the inner cylinder 2114 by a sealing plate.

In the working process of the burner, an air-gas mixture obtained before entering the burner or an air-gas mixture mixed in the premixing area 2115 pauses in the premixing area 2115 for a short time and then enters the porous medium material layer 214 through the gas channel of the heat-insulating material layer so as to be burned. As a container for combustible gases, it is necessary to ensure that the temperature at any point in the premixing area 2115 is not too high; otherwise, a combustion phenomenon, namely flashback, will occur in the premixing area 2115.

To promptly cool down the premixing area 2115, the cooling interlayer 212 is provided with a cooling inlet 2122 and a cooling outlet 2123 of the cooling medium. The cooling inlet 2122 and the cooling outlet 2123 are adjacent to the air inlet 2112.

Figure 15:
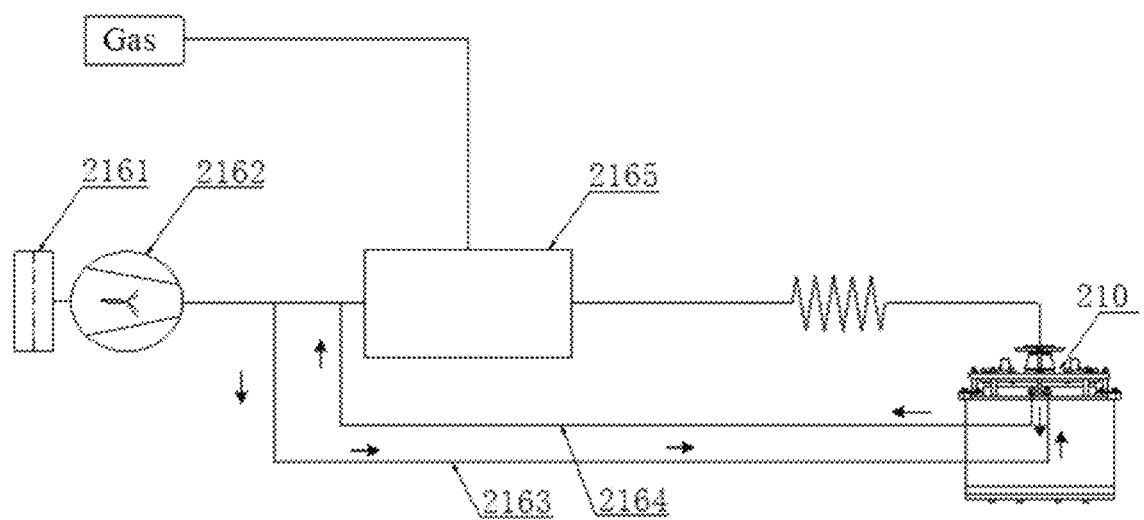
FIG. 15 is a connection diagram of a cooling interlayer of FIG. 14.

In the present application, different cooling media are selected according to different furnace temperature requirements. In an embodiment, the furnace temperature is required to be below 700° C., and gas is used as the cooling medium. Referring to FIG. 15, the infrared burner 210 also includes a combustion-supporting air duct 2161 communicating with the air inlet 2112. The combustion-supporting air duct 2161 is connected to the air-gas mixer 2165 by a combustion-supporting fan 2162 and is configured to lead air from the combustion-supporting air duct 2161 into the air-gas mixer 2165. Gas is also led into the air-gas mixer 2165 so as to be mixed with the air. The obtained premixed gases enter the chamber of the burner through the air inlet 2112. The combustion-supporting air duct 2161 communicates with the cooling inlet 2122 by a first branch 2163 and communicates with the cooling outlet 2123 by a second branch 2164. The connection point between the first branch 2163 and the combustion-supporting air duct 2161 and the connection point between the second branch 2164 and the combustion-supporting air duct 2161 are located between the combustion-supporting fan 2162 and the air-gas mixer 2165. The connection point between the second branch 2164 and the combustion-supporting air duct 2161 is closer to the air-gas mixer 2165 and the air inlet 2112 than the connection point between the first branch 2163 and the combustion-supporting air duct 2161. The low-temperature combustion-supporting air enters the cooling inlet 2122 through the first branch 2163 and exchanges heat with the inner cylinder 2114 in the cooling interlayer 212. The heated combustion-supporting air is then discharged into the second branch 2164 through the cooling outlet 2123. Since the connection point between the second branch 2164 and the combustion-supporting air duct 2161 is closer to the air-gas mixer 2165, the heated combustion-supporting air enters the air-gas mixer 2165. In this manner, gas can be preheated in the process of mixing air and gas.

Figure 16:
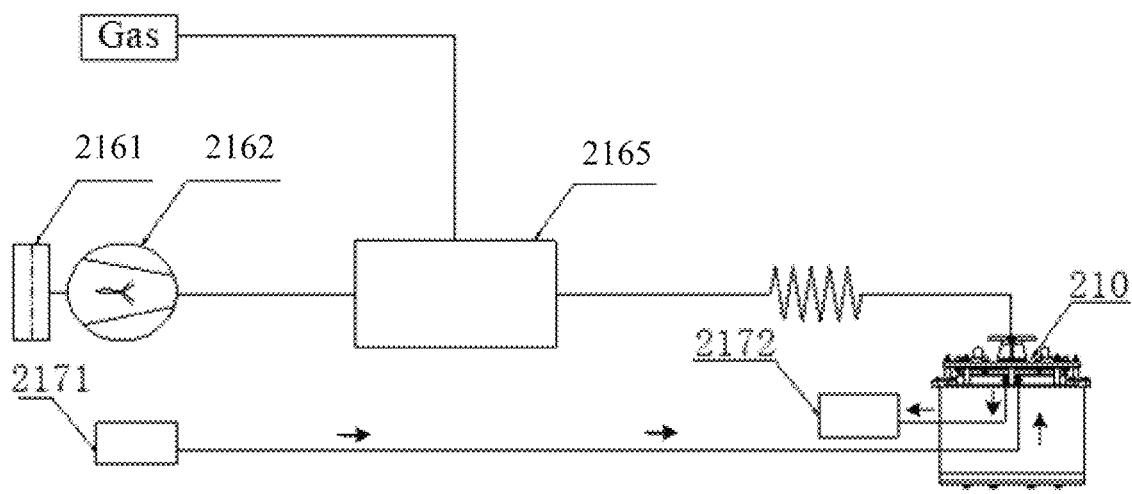
FIG. 16 is another connection diagram of the cooling interlayer of FIG. 14.

In an embodiment, when a furnace temperature of 700° C. to 1150° C. is required and when the furnace temperature is in the high-temperature range greater than 1000° C., a liquid cooling technology should be used. The cooling medium may be water or oil to achieve stable control of the overall temperature of the burner housing. Referring to FIG. 16, the functions of forming premixed gas and feeding into the burner are retained by a structure such as an air-gas mixer 2165, and the infrared burner 210 also includes a cooling water tank 2171 and a hot water tank 2712. The cooling water tank 2171 communicates with the cooling inlet 2122. The hot water tank 2712 communicates with the cooling outlet 2123.

During the operation of the burner, due to the different thermal conductivities of materials, heat conducted from the heat-insulating material plate 213 to the inner cylinder 2114 is cooled by the cooling medium in the cooling interlayer 212, thus avoiding deformation of the housing of the burner at a high temperature. At the same time, a difficulty in achieving a high adjustment ratio is to prevent flashback when the mixed combustion gas flows at a low speed, ensuring that the flow rate of the mixed combustion gas is always higher than the flame propagation speed. The contact surface between the heat-insulating material plate 213 and the porous medium material layer 214 is maintained at a low temperature, and the temperature is lower than the ignition point of the gas. When the power of the burner is reduced by reducing the flow rate of the mixed combustion gas, the low temperature can reduce the flame propagation speed. Even if the flow rate of the mixed combustion gas is small, the anti-flashback effect can be maintained, thereby increasing the adjustment ratio of the burner.

To ensure real-time monitoring of the temperature of the premixing area 2115, the glass tempering furnace also includes a thermocouple 2151 inserted in the premixing area 2115. The probe end of thermocouple 2151 is adjacent to the inner wall of the premixing area 2115.

For heat insulation and heat preservation of the housing, a heat preservation material layer 2152 is disposed around the cooling interlayer 212.

To support the housing, the infrared burner 210 also includes a bottom heat-insulating panel 2154 for supporting the housing and the cooling interlayer 212. The bottom heat-insulating panel 2154 has a heat release hole corresponding to the heat release port 2113, which does not affect the dissipation of heat.

A bottom panel 2156 made of metal is generally provided below the heat-insulating material support layer 2153 of the burner, there is typically a metal for support. Due to the bottom panel 2156 faced with a high temperature inside the furnace is heated to expend and produce a high temperature creep effect, which may cause the bottom panel 2156 to warp. Once the deformation is excessive, the heat-insulating material support layer 2153 is damaged by the force caused by the deformation, causing the porous medium material layer 214 carried on the heat-insulating material support layer 2153 to become unstable. Therefore, a stiffener 2157 is added in this embodiment to weld and reinforce the bottom panel 2156 of the burner. One part of the stiffener 2157 is welded to the inner cylinder 2114, and the other part of the stiffener 2157 is welded to the bottom panel 2156.

In this embodiment, the heat-insulating material layer is closely adhered to the porous medium material layer 214. A pressing mechanism 2155 arranged along the air inlet direction is disposed in the premixing area 2115. A first end of the pressing mechanism 2155 is connected to the housing. A second end of the pressing mechanism 2155 abuts against the heat-insulating material layer and presses the heat-insulating material layer to ensure that the heat-insulating material layer remains tightly adhered to the porous medium material layer 214. Three pressing mechanisms 2155 are provided. The three pressing mechanisms 2155 are equally spaced apart around the axis of the housing. In an embodiment, four pressing mechanisms 2155 are provided. The four pressing mechanisms 2155 are disposed at the four corners of the housing. The pressing mechanism 2155 enables the heat-insulating material layer to be always tightly adhered to the porous medium material layer 214, avoiding gaps between the heat-insulating material layer and the porous medium material layer 214 due to thermal expansion of the burner in a working process, and thus avoiding poor combustion caused by rapid heat diffusion due to the gaps.

The working process of each infrared burner 210 is as follows:

The premixed gas of the combustion-supporting air and the gas enters the chamber through the air inlet 2112 and stops in the premixing area 2115 for a short time. The premixed gas is mixed in a turbulent manner in the premixing area 2115 while cooling the surrounding wall to a certain extent.

Premixed gas enters the porous medium material layer 214 along gas channel in the heat-insulating material layer and completes combustion in the porous medium material layer 214. Since gas is ignited in the beginning, as premixed gas enters continuously, the combustion process in the porous medium material layer 214 continues, and the porous medium material in the normal working state presents an infrared state.

The cooling medium enters the inner cylinder 2114 through the cooling inlet 2122, moves one circle around the inner cylinder 2114 in the cooling layer 212 and is discharged through the cooling outlet 2123 to control the overall temperature of the housing. The thermocouple 2151 monitors the temperature of the premixing area 2115 in real time to evaluate the cooling effect of the cooling medium.

In the description of the specification, the description of reference terms such as "some embodiments" and "other embodiments" is intended to mean that features, structures, materials, or characteristics described in conjunction with such embodiments or examples are included in at least one embodiment or example of the present application. In the specification, the illustrative description of these terms does not necessarily refer to the same embodiment or example. Moreover, the described features, structures, materials, or characteristics may be combined in an appropriate manner in one or more embodiments or examples.

What is claimed is:

1. A glass tempering furnace, comprising:
   a preheating furnace section having a feed port, wherein a general smoke vent is disposed at the feed port, and the preheating furnace section is divided into a plurality of sections along a glass traveling direction, wherein each section of the plurality of sections has a smoke suction port and a smoke ejection port;
   a heating furnace section provided with a plurality of infrared burners, wherein each of the plurality of infrared burners is a porous medium burner, and each section is configured to suck smoke from the heating furnace section through the smoke suction port and deliver the sucked smoke to the preheating furnace section through the smoke ejection port; and
   a soaking furnace section disposed after the heating furnace section along the glass traveling direction, wherein a plurality of air ducts are disposed in the soaking furnace section and configured to generate horizontally parallel airflow on upper and lower surfaces of glass.

2. The glass tempering furnace of claim 1, further comprising a plurality of drive rollers passing through the preheating furnace section, the heating furnace section, and the soaking furnace section in sequence, wherein
   a plurality of smoke ejection air knives are disposed on upper and lower sides of drive rollers in each section of the preheating furnace section along the glass traveling direction, the plurality of smoke ejection air knives are staggered with the drive rollers in each section in a height direction, and the smoke ejection port is configured to deliver the sucked smoke to the plurality of smoke ejection air knives.

3. The glass tempering furnace of claim 2, wherein a diameter of an air knife outlet of each of the plurality of smoke ejection air knives is contracted.

4. The glass tempering furnace of claim 3, wherein an incrementer is disposed in the preheating furnace section, the incrementer has a Venturi channel, and the Venturi channel is connected to the air knife outlet of each of the plurality of smoke ejection air knives.

5. The glass tempering furnace of claim 1, wherein the plurality of infrared burners are staggered on upper and lower sides of a plurality of drive rollers along the glass traveling direction.

6. The glass tempering furnace of claim 5, wherein airflow stirring devices are disposed in the heating furnace section and spaced from the plurality of infrared burners along the glass traveling direction.

7. The glass tempering furnace of claim 1, wherein each air duct of the plurality of air ducts has air outlets and air suction ports, wherein the air outlets are respectively disposed above and below drive rollers in the soaking furnace section and at a first end of the drive rollers in the soaking furnace section along a radial direction of the drive rollers in the soaking furnace section to enable air blown out from the air outlets to reach the first end of the drive rollers in the soaking furnace section, blow out from a gap between adjacent drive rollers of the drive rollers in the soaking furnace section, and blow over the upper and lower surfaces of the glass along a direction parallel to the drive rollers in the soaking furnace section;
   wherein the air suction ports are respectively disposed above and below the drive rollers in the soaking furnace section and adjacent to a second end of the drive rollers in the soaking furnace section and the air suction ports are configured to suck in the air blowing over the upper and lower surfaces of the glass.

8. The glass tempering furnace of claim 7, wherein each of the plurality of air ducts comprises a centrifugal fan and an air duct body, wherein the air duct body comprises an air-suction air duct section and an air-blowing air duct section, and the centrifugal fan is configured to rotate to suck air in and throw the air out to make the air flow in the air duct body;
   a first end of the air-blowing air duct section is connected to an outlet of the centrifugal fan, and the air outlets are disposed at a second end of the air-blowing air duct section; and
   a first end of the air-suction air duct section is connected to an inlet of the centrifugal fan, and the air suction ports are disposed at a second end of the air-suction air duct section.

9. The glass tempering furnace of claim 8, wherein the air-blowing air duct section comprises a first air duct portion and a second air duct portion, wherein the first air duct portion is parallel to the drive rollers in the soaking furnace section, the second air duct portion is perpendicular to the drive rollers in the soaking furnace section, and the air outlets are disposed on a sidewall surface of the second air duct portion facing the first end of the drive rollers in the soaking furnace section.

10. The glass tempering furnace of claim 8, wherein each air duct of the soaking furnace section further comprises a heater, wherein the heater is disposed below an impeller of the centrifugal fan to enable air sucked in by rotation of the impeller to pass through the heater and then to enter the impeller.

11. The glass tempering furnace of claim 10, wherein, for each of the air ducts of the soaking furnace section, a heating part of the heater is disposed in the air-suction air duct section.

12. The glass tempering furnace of claim 8, wherein the air suction ports are disposed on a sidewall surface of the air-suction air duct section facing the second end of the drive rollers in the soaking furnace section.

13. The glass tempering furnace of claim 1, wherein the preheating furnace section, the heating furnace section, and the soaking furnace section are each divided into an upper furnace portion and a lower furnace portion, wherein the upper furnace portion is disposed above a plurality of drive rollers, and the lower furnace portion is disposed below the plurality of drive rollers.

14. The glass tempering furnace of claim 1, wherein the porous medium burner comprises a housing, the housing has a chamber, an air inlet connected to the chamber, and a heat release port connected to the chamber; a premixing area, an anti-flashback area, and a combustion area are disposed in sequence in the chamber along an air inlet direction from the air inlet to the heat release port;

wherein the anti-flashback area is filled with a heat-insulating material layer, a porous medium material layer is disposed in the combustion area, and the heat-insulating material layer has a gas channel communicating with the premixing area and the porous medium material layer; and a cooling interlayer for receiving a cooling medium is disposed around the housing, and the cooling interlayer at least wraps part of the premixing area, part of the anti-flashback area, and part of the combustion area.

15. The glass tempering furnace of claim 14, wherein the housing comprises an inner cylinder and a cover plate having the air inlet, the cover plate covers one end of the inner cylinder to form the chamber, an outer cylinder is sleeved on the inner cylinder, and the cooling interlayer is formed between the inner cylinder and the outer cylinder.

16. The glass tempering furnace of claim 14, wherein the cooling interlayer has a cooling inlet and a cooling outlet for the cooling medium, wherein the cooling inlet and the cooling outlet are adjacent to the air inlet.

17. The glass tempering furnace of claim 16, further comprising a combustion-supporting air duct communicating with the air inlet, wherein the combustion-supporting air duct communicates with the cooling inlet by a first branch, the combustion-supporting air duct communicates with the cooling outlet by a second branch, and a connection point between the second branch and the combustion-supporting air duct is closer to the air inlet than a connection point between the first branch and the combustion-supporting air duct.

18. The glass tempering furnace of claim 16, further comprising a cooling water tank and a hot water tank, wherein the cooling water tank communicates with the cooling inlet, and the hot water tank communicates with the cooling outlet.

19. The glass tempering furnace of claim 14, wherein the porous medium burner is set in at least one of the following manners:
a heat preservation material layer is disposed around the cooling interlayer;
a heat-insulating material support layer for supporting the heat-insulating material layer is disposed in the chamber and adjacent to the heat release port and has a heat release channel corresponding to the porous medium material layer, wherein the heat release channel communicates with the heat release port;
the glass tempering furnace further comprises a bottom heat-insulating panel for supporting the housing, wherein the bottom heat-insulating panel has a heat release hole corresponding to the heat release port; or
the glass tempering furnace further comprises a thermocouple inserted in the premixing area.

20. The glass tempering furnace of claim 14, wherein a depth-to-diameter ratio of the gas channel of the heat-insulating material layer is 30:1 to 80:1.

21. A glass tempering method, applied to a glass tempering furnace which comprises a preheating furnace section, a heating furnace section provided with a plurality of infrared burners, a soaking furnace section disposed after the heating furnace section along a glass traveling direction, and a plurality of drive rollers passing through the preheating furnace section, the heating furnace section, and the soaking furnace section in sequence, and comprising:
manually or automated device laying a glass in a single layer of the glass on a material layout platform to place products;
carrying the glass on the plurality of drive rollers to the preheating furnace section and preheating the glass in the preheating furnace section, wherein the preheating furnace section has a feed port, a general smoke vent is disposed at the feed port, and the preheating furnace section is divided into a plurality of sections along the glass traveling direction, wherein each section of the plurality of sections has a smoke suction port and a smoke ejection port;
carrying the glass to the heating furnace section and heating the glass in the heating furnace section to a set temperature of 600° C. to 640° C., wherein each of the plurality of infrared burners is a porous medium burner, and each section is configured to suck smoke from the heating furnace section through the smoke suction port and deliver the sucked smoke to the preheating furnace section through the smoke ejection port; and
carrying the glass from the heating furnace section to the soaking furnace section and heating the glass and homogenizing a temperature of the glass by circulating gas sweeping across upper and lower surfaces of the glass, wherein a plurality of air ducts are disposed in the soaking furnace section and configured to generate horizontally parallel airflow on the upper and lower surfaces of the glass.

* * * * *